(12) United States Patent
Xing et al.

(10) Patent No.: US 12,461,337 B2
(45) Date of Patent: Nov. 4, 2025

(54) OPTICAL IMAGING LENS ASSEMBLY

(71) Applicant: Zhejiang Sunny Optics Co., Ltd, Yuyao (CN)

(72) Inventors: Cheng Xing, Yuyao (CN); Litong Song, Yuyao (CN); Tingting Gong, Yuyao (CN); Fujian Dai, Yuyao (CN); Liefeng Zhao, Yuyao (CN)

(73) Assignee: Zhejiang Sunny Optics Co., Ltd (CN)

( * ) Notice: Subject to any disclaimer, the term of this patent is extended or adjusted under 35 U.S.C. 154(b) by 688 days.

(21) Appl. No.: 17/560,241

(22) Filed: Dec. 22, 2021

(65) Prior Publication Data
US 2022/0236522 A1 Jul. 28, 2022

(30) Foreign Application Priority Data

Jan. 20, 2021 (CN) .......................... 202110073683.3

(51) Int. Cl.
*G02B 9/60* (2006.01)
*G02B 1/04* (2006.01)
(Continued)

(52) U.S. Cl.
CPC ................ *G02B 9/60* (2013.01); *G02B 1/041* (2013.01); *G02B 3/04* (2013.01); *G02B 7/008* (2013.01); *G02B 13/0045* (2013.01)

(58) Field of Classification Search
CPC ........ G02B 13/0045; G02B 9/60; G02B 3/04; G02B 1/041; G02B 7/008
(Continued)

(56) References Cited

U.S. PATENT DOCUMENTS 8,395,853 B2 * 3/2013 Chen .................... G02B 13/006
359/708
2016/0065811 A1 * 3/2016 Jo ....................... G02B 13/0045
348/340
(Continued)

FOREIGN PATENT DOCUMENTS

CN 104166220 A 11/2014
CN 107179599 A * 9/2017 ............... G01C 3/32
(Continued)

OTHER PUBLICATIONS

Wei, CN-111650731-A, Sep. 11, 2020, Translation from Espacenet (Year: 2020).*
(Continued)

*Primary Examiner* — William R Alexander
*Assistant Examiner* — Alaina Marie Swanson
(74) *Attorney, Agent, or Firm* — Barnes & Thornburg

(57) ABSTRACT

Embodiments of the present disclosure provide an optical imaging lens assembly that comprising, sequentially from an object side to an image side of the optical imaging lens assembly along an optical axis: a first lens having a negative refractive power, an object side surface of the first lens is convex surface and an image side surface of the first lens is a concave surface; a stop; a second lens having a positive refractive power, an object side surface of the second lens is a concave surface and an image side surface of the second lens is a convex surface; a third lens having a refractive power; a fourth lens having a refractive power, an object side surface of the fourth lens is a concave surface and an image side surface of the fourth lens is a convex surface. A relative illuminance RI corresponding to a maximal field-of-view of the optical imaging lens assembly satisfies: RI≥50%; and at least one of the first lens to the fifth lens is a lens made of plastic material.

18 Claims, 10 Drawing Sheets

(51) Int. Cl.
*G02B 3/04* (2006.01)
*G02B 7/00* (2021.01)
*G02B 13/00* (2006.01)

(58) Field of Classification Search
USPC .................................................. 359/714, 715
See application file for complete search history.

(56) References Cited

U.S. PATENT DOCUMENTS

2018/0284393 A1* 10/2018 Huang ............... G02B 13/0045
2019/0204542 A1* 7/2019 Lai ..................... G02B 13/0045
2020/0379220 A1* 12/2020 Huang ................. G02B 13/18

FOREIGN PATENT DOCUMENTS

| CN | 108254880 | A | | 7/2018 | | |
| CN | 109100851 | A | | 12/2018 | | |
| CN | 109116522 | A | * | 1/2019 | ......... | G02B 13/0045 |
| CN | 105093483 | B | * | 5/2019 | ......... | G02B 13/0015 |
| CN | 109782418 | A | | 5/2019 | | |
| CN | 110058386 | A | | 7/2019 | | |
| CN | 110262015 | A | * | 9/2019 | ......... | G02B 13/0045 |
| CN | 110727083 | A | * | 1/2020 | ......... | G02B 13/0045 |
| CN | 110749976 | A | * | 2/2020 | ......... | G02B 13/0015 |
| CN | 110908080 | A | | 3/2020 | | |
| CN | 111290106 | A | | 6/2020 | | |
| CN | 111474682 | A | | 7/2020 | | |
| CN | 112147759 | A | | 12/2020 | | |
| CN | 114660765 | A | * | 6/2022 | ......... | G02B 13/0045 |

OTHER PUBLICATIONS

Gross et al. "Handbook of Optical Systems vol. 3: Aberration Theory and Correction of Optical Systems" Weinheim Germany, Wiley-VCH Verlag Gmbh & Co. KGaA, pp. 377-379 (Year: 2007).*
First Chinese Office Action for Application No. 202110073683.3, dated Feb. 28, 2022, 14 pages.
Second Chinese Office Action for Application No. 202110073683.3, dated May 19, 2022, 14 pages.

* cited by examiner

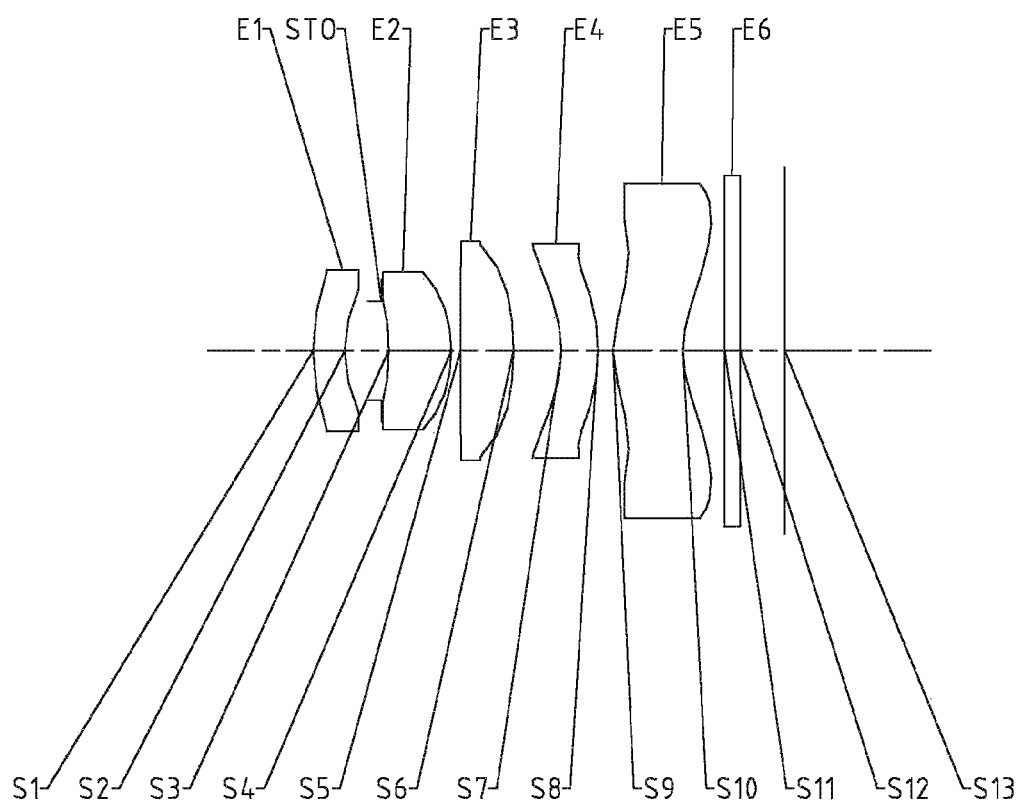
Fig. 3
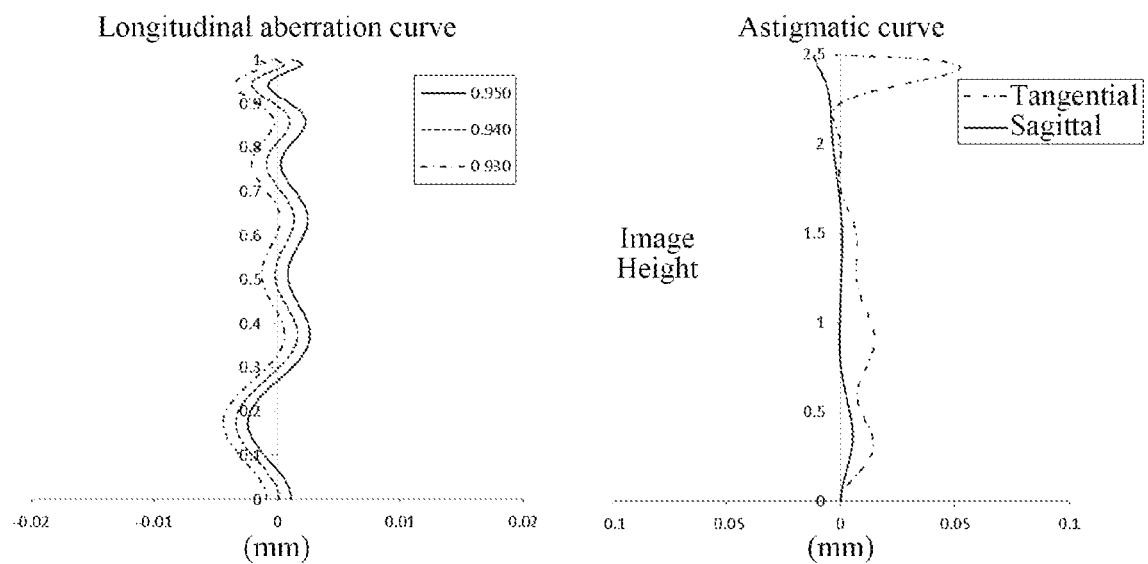
Fig. 4A
Fig. 4B

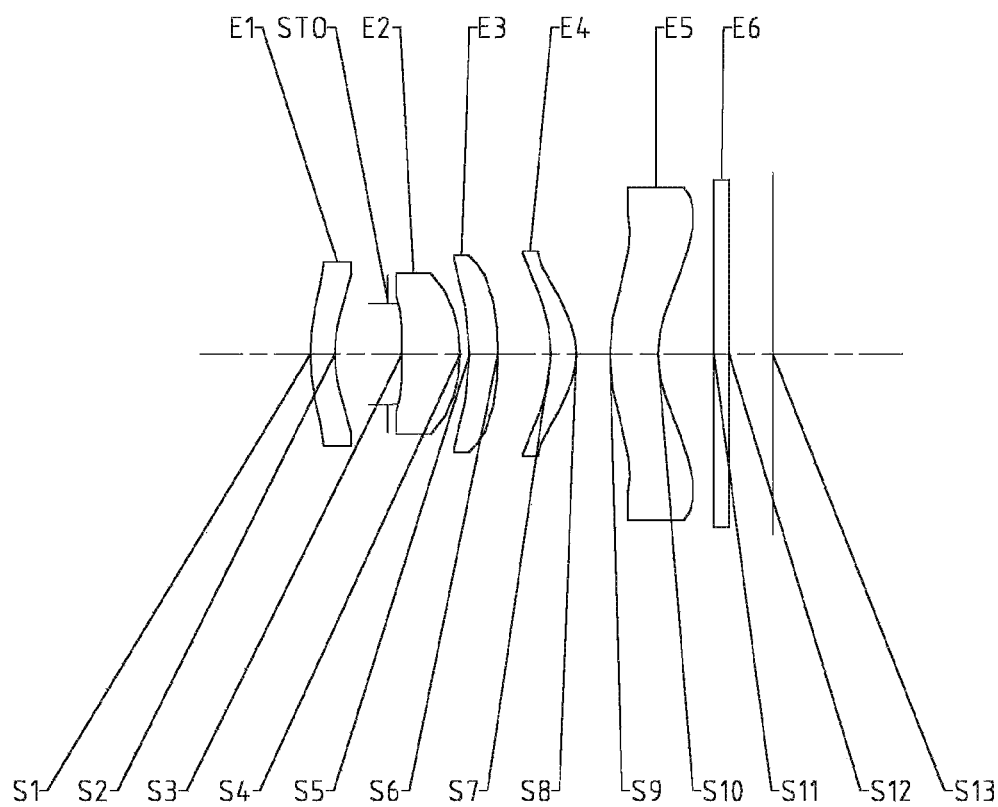
Fig. 7
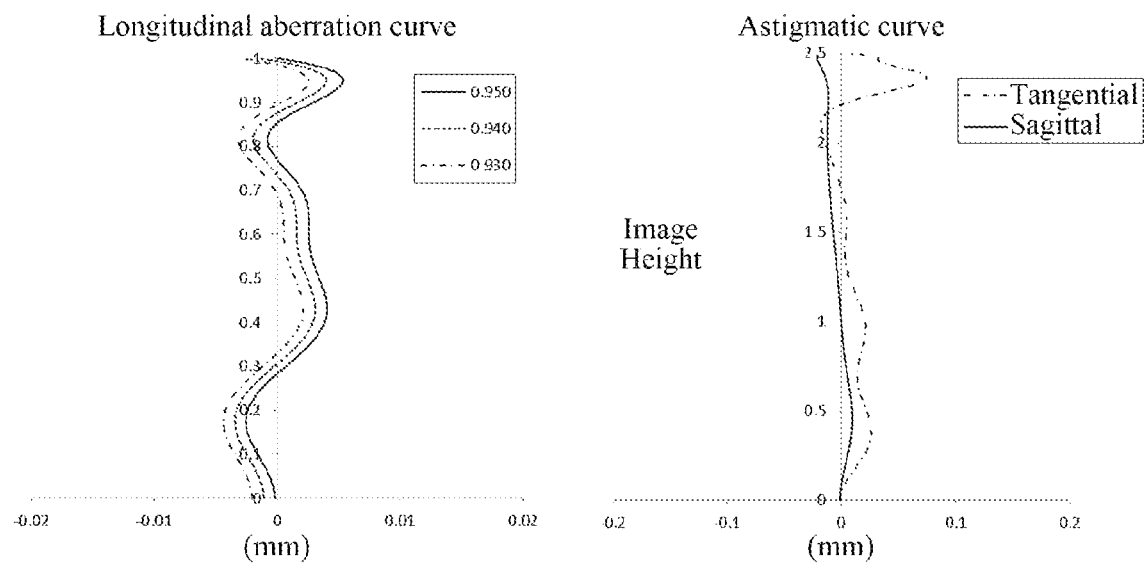
Fig. 8A
Fig. 8B

OPTICAL IMAGING LENS ASSEMBLY

TECHNICAL FIELD

The present disclosure relates to the field of optical elements, and particularly to an optical imaging lens assembly.

BACKGROUND

In recent years, structured light technology has been greatly popularized and plays an increasingly important role in the field of depth information collection. The use of structured light technology to collect depth information of an object has greatly improved the accuracy of collection. At present, structured light technology has been widely used in various application scenarios such as 3D face recognition, financial security payment, and somatosensory gesture recognition. Particularly, the structured light technology uses a projector to project structured light onto the surface of the object to reflect the structural information of the object surface. When the optical imaging lens assembly photographs the object, it can form a three-dimensional image of the object according to the structural information of the object surface.

At the same time, the application of structured light technology can also complete the restoration of three-dimensional scenarios and achieve difficult technical requirements such as 3D modeling. In order to expand the application range of structured light technology, lens assembly manufacturers have begun to study how to realize the miniaturization of the lens assembly and improve the temperature stability, viewing range and imaging quality of the optical imaging lens assembly on the basis of ensuring that the lens assembly can receive structured light, so that to broaden the application of structured light technology in portable electronic products.

SUMMARY

According to an aspect, some embodiments of the present disclosure provide an optical imaging lens assembly that comprises, sequentially from an object side to an image side of the optical imaging lens assembly along an optical axis: a first lens having a negative refractive power, an object side surface of the first lens is convex surface and an image side surface of the first lens is a concave surface: a stop: a second lens having a positive refractive power, an object side surface of the second lens is a concave surface and an image side surface of the second lens is a convex surface: a third lens having a refractive power: a fourth lens having a refractive power, an object side surface of the fourth lens is a concave surface and an image side surface of the fourth lens is a convex surface; and a fifth lens having a refractive power. A relative illuminance RI corresponding to a maximal field-of-view of the optical imaging lens assembly may satisfy: RI≥50%; and at least one of the first lens to the fifth lens is a lens made of plastic material.

In an embodiment, an Abbe number V3 of the third lens, an Abbe number V4 of the fourth lens, and an Abbe number V5 of the fifth lens may satisfy: V3+V4+V5<65.

In an embodiment, an effective focal length f1 of the first lens and an effective focal length f2 of the second lens may satisfy: −5.0<f1/f2<−2.0.

In an embodiment, an effective focal length f5 of the fifth lens and a total effective focal length f of the optical imaging lens assembly may satisfy: 1.5<|f5/f|<4.5.

In an embodiment, an effective focal length f4 of the fourth lens and a total effective focal length f of the optical imaging lens assembly may satisfy: 1.0<|f4/f|<2.5.

In an embodiment, an effective focal length f3 of the third lens and a total effective focal length f of the optical imaging lens assembly may satisfy: 1.5<|f3/f|<7.0.

In an embodiment, a radius of curvature R1 of the object side surface of the first lens and a radius of curvature R2 of the image side surface of the first lens may satisfy: 2.5<(R1+R2)/(R1−R2)<5.5.

In an embodiment, a radius of curvature R7 of the object side surface of the fourth lens and a radius of curvature R8 of the image side surface of the fourth lens may satisfy: 2.5<|(R7+R8)/(R7−R8)|<6.5.

In an embodiment, a radius of curvature R9 of an object side surface of the fifth lens and a radius of curvature R10 of an image side surface of the fifth lens may satisfy: 0.5<R9/R10<2.5.

In an embodiment, an effective focal length f2 of the second lens and the radius of curvature R4 of the image side surface of the second lens may satisfy: −2.0<f2/R4<−1.0.

In an embodiment, an effective focal length f3 of the third lens and a radius of curvature R6 of an image side surface of the third lens may satisfy: 1.0<|f3/R6|<3.0.

In an embodiment, the central thickness CT1 of the first lens along the optical axis and the spaced interval T12 between the first lens and the second lens along the optical axis may satisfy: 1.0<T12/CT1<3.0.

In an embodiment, a central thickness CT2 of the second lens along the optical axis and a spaced interval T23 between the second lens and the third lens along the optical axis may satisfy: 6.0<CT2/T23<8.6.

In an embodiment, a spaced interval T34 between the third lens and the fourth lens on the optical axis and a spaced interval T45 between the fourth lens and the fifth lens on the optical axis may satisfy: 1.5<T34/T45<8.0.

In an embodiment, at least one of the first lens to the fifth lens is a glass aspheric lens.

In an embodiment, a distortion f0 of the optical imaging lens assembly may satisfy: |fθ|<5%.

In an embodiment, a total effective focal length f of the optical imaging lens assembly and an entrance pupil diameter EPD of the optical imaging lens assembly may satisfy: f/EPD<2.1.

In an embodiment, a half of the diagonal length ImgH of an effective pixel area on an imaging plane of the optical imaging lens assembly and a half of a maximal field-of-view Semi-FOV of the optical imaging lens assembly may satisfy: 1.0 mm<ImgH/Tan(Semi-FOV)<2.0 mm.

According to another aspect, some embodiments of the present disclosure provide an optical imaging lens assembly. The optical imaging lens assembly comprises, sequentially from an object side to an image side of the optical imaging lens assembly along an optical axis: a first lens having a negative refractive power, an object side surface of the first lens is a convex surface and an image side surface of the first lens is a concave surface: a stop: a second lens having a positive refractive power, an object side surface of the second lens is a concave surface and an image side surface of the second lens is a convex surface: a third lens having a refractive power: a fourth lens having a refractive power, an object side surface of the fourth lens is concave surface and an image side surface of the fourth lens is a convex surface; and a fifth lens having a refractive power. An effective focal length f5 of the fifth lens and a total effective focal length f of the optical imaging lens assembly satisfy: $1.5<|f5/f|<4.5$; and at least one of the first lens to the fifth lens is a lens made of plastic material.

In an embodiment, an Abbe number V3 of the third lens, an Abbe number V4 of the fourth lens, and an Abbe number V5 of the fifth lens may satisfy: $V3+V4+V5<65$.

In an embodiment, an effective focal length f1 of the first lens and an effective focal length f2 of the second lens may satisfy: $-5.0<f1/f2<-2.0$.

In an embodiment, an effective focal length f4 of the fourth lens and the total effective focal length f of the optical imaging lens assembly may satisfy: $1.0<|f4/f|<2.5$.

In an embodiment, an effective focal length f3 of the third lens and the total effective focal length f of the optical imaging lens assembly may satisfy: $1.5<|f3/f|<7.0$.

In an embodiment, a radius of curvature R1 of the object side surface of the first lens and a radius of curvature R2 of the image side surface of the first lens may satisfy: $2.5<(R1+R2)/(R1-R2)<5.5$.

In an embodiment, a radius of curvature R7 of the object side surface of the fourth lens and a radius of curvature R8 of the image side surface of the fourth lens may satisfy: $2.5<|(R7+R8)/(R7-R8)|<6.5$.

In an embodiment, a radius of curvature R9 of an object side surface of the fifth lens and a radius of curvature R10 of an image side surface of the fifth lens may satisfy: $0.5<R9/R10<2.5$.

In an embodiment, an effective focal length f2 of the second lens and a radius of curvature R4 of the image side surface of the second lens may satisfy: $-2.0<f2/R4<-1.0$.

In an embodiment, an effective focal length f3 of the third lens and a radius of curvature R6 of an image side surface of the third lens may satisfy: $1.0<|f3/R6|<3.0$.

In an embodiment, a central thickness CT1 of the first lens along the optical axis and a spaced interval T12 between the first lens and the second lens along the optical axis may satisfy: $1.0<T12/CT1<3.0$.

In an embodiment, a central thickness CT2 of the second lens along the optical axis and a spaced interval T23 between the second lens and the third lens along the optical axis may satisfy: $6.0<CT2/T23<8.6$.

In an embodiment, a spaced interval T34 between the third lens and the fourth lens on the optical axis and a spaced interval T45 between the fourth lens and the fifth lens on the optical axis may satisfy: $1.5<T34/T45<8.0$.

In an embodiment, at least one of the first lens to the fifth lens is a glass aspheric lens.

In an embodiment, a distortion fθ of the optical imaging lens assembly may satisfy: $|fθ|<5\%$.

In an embodiment, a total effective focal length f of the optical imaging lens assembly and an entrance pupil diameter EPD of the optical imaging lens assembly may satisfy: $f/EPD<2.1$.

In an embodiment, a half of the diagonal length ImgH of an effective pixel area on an imaging plane of the optical imaging lens assembly and a half of a maximal field-of-view Semi-FOV of the optical imaging lens assembly may satisfy: $1.0\ mm<ImgH/Tan(Semi\text{-}FOV)<2.0\ mm$.

In an embodiment, a relative illuminance RI corresponding to a maximal field-of-view of the optical imaging lens assembly may satisfy: $RI\geq50\%$.

Embodiments of the present disclosure uses multiple (for example, five) lenses. By reasonably distributing the refractive powers, surface types, center thicknesses of the lenses, and the axial distances between the lenses, the above optical imaging lens assembly has at least one beneficial effect, such as a compact size, being capable of receiving structured light, and high imaging quality.

BRIEF DESCRIPTION OF THE DRAWINGS

Other features, objects, and advantages of the present disclosure will become more apparent from the following detailed description of the non-limiting embodiments with reference to the accompanying drawings. In the drawings:

FIG. 3 shows a schematic structural diagram of an optical imaging lens assembly according to Example 2 of the present disclosure;

FIGS. 4A-4E respectively show a longitudinal aberration curve, an astigmatism curve, a distortion curve, a lateral color curve, and a relative illuminance curve of the optical imaging lens assembly of Example 2;

FIG. 7 shows a schematic structural diagram of an optical imaging lens assembly according to Example 4 of the present disclosure;

FIGS. 8A-8E respectively show a longitudinal aberration curve, an astigmatism curve, a distortion curve, a lateral color curve, and a relative illuminance curve of the optical imaging lens assembly of Example 4;

DETAILED DESCRIPTION OF EMBODIMENTS

Figure 1:
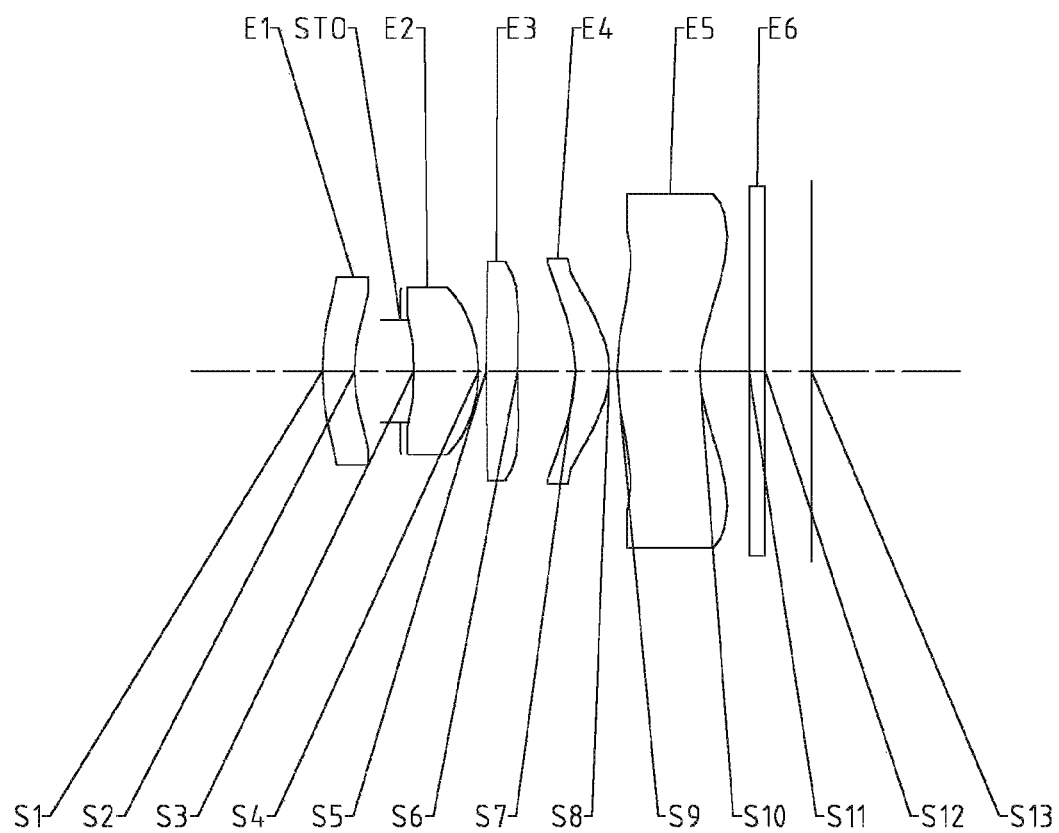
FIG. 1 shows a schematic structural diagram of an optical imaging lens assembly according to Example 1 of the present disclosure.

In order to better understand the present disclosure, various aspects of the present disclosure will be described in more detail with reference to the accompanying drawings. It should be understood that these detailed descriptions are only descriptions of exemplary embodiments of the present disclosure, and are not intended to limit the scope of the present disclosure in any way. Throughout the specification, the same reference numerals refer to the same elements. The expression "and/or" includes any and all combinations of one or more of the associated listed items.

It should be noted that, in the specification, the expressions such as "first," "second," and "third" are only used to distinguish one feature from another, rather than represent any limitations to the features. Thus, the first lens discussed below may also be referred to as the second lens or the third lens without departing from the teachings of the present disclosure.

In the accompanying drawings, the thicknesses, sizes and shapes of the lenses are slightly exaggerated for the convenience of explanation. Specifically, shapes of spherical surfaces or aspheric surfaces shown in the accompanying drawings are shown by examples. That is, the shapes of the spherical surfaces or the aspheric surfaces are not limited to the shapes of the spherical surfaces or the aspheric surfaces shown in the accompanying drawings. The accompanying drawings are merely illustrative and not strictly drawn to scale.

In the description of the present disclosure, a paraxial area refers to an area near an optical axis. If a lens surface is a convex surface and the position of the convex surface is not defined, it represents that the lens surface is a convex surface at least at the paraxial area. If the lens surface is a concave surface and the position of the concave surface is not defined, it represents that the lens surface is a concave surface at least at the paraxial area. A surface of each lens that is closest to a photographed object is referred to as the object side surface of the lens, and a surface of the each lens that is closest to an imaging plane is referred to as the image side surface of the lens.

It should be further understood that the terms "comprise," "comprising," "having," "include" and/or "including." when used in the specification, specify the presence of stated features, elements and/or components, but do not exclude the presence or addition of one or more other features, elements, components and/or combinations thereof. In addition, expressions such as "at least one of" when preceding a list of listed features, modify the entire list of features rather than an individual element in the list. Further, the use of "may" when describing the implementations of the present disclosure, relates to "one or more implementations of the present disclosure." Also, the term "exemplary" is intended to refer to an example or illustration.

Unless otherwise defined, all terms (including technical and scientific terms) used herein have the same meaning as commonly understood by those of ordinary skill in the art to which the present disclosure belongs. It should be further understood that terms (i.e., those defined in commonly used dictionaries) should be interpreted as having a meaning that is consistent with their meaning in the context of the relevant art and will not be interpreted in an idealized or overly formal sense unless expressly so defined herein.

It should be noted that the embodiments in the present disclosure and the features in the embodiments may be combined with each other on a non-conflict basis. The present disclosure will be described below in detail with reference to the accompanying drawings and in combination with the embodiments.

Features, principles and other aspects of the present disclosure will be described below in detail.

An optical imaging lens assembly according to exemplary embodiments of the present disclosure may include five lenses having refractive powers, which are a first lens, a second lens, a third lens, a fourth lens, and a fifth lens, respectively. The five lenses are arranged sequentially along an optical axis from an object side to an image side. Any two adjacent lenses among the first lens to the fifth lens may have a spaced interval between them.

In an exemplary embodiment, the first lens may have a negative refractive power, an object side surface of the first lens may be a convex surface, and an image side surface of the first lens may be a concave surface: the second lens may have a positive refractive power, an object side surface of the second lens may be a concave surface, and an image side surface of the second lens may be a convex surface: the third lens may have a positive refractive power or a negative refractive power: the fourth lens may have a positive refractive power or a negative refractive power, an object side surface of the fourth lens may be a concave surface, and an image side surface of the fourth lens may be a convex surface; and the fifth lens may have a positive refractive power or a negative refractive power. By reasonably distributing the refractive powers and surface types of the first lens to the fifth lens, it is beneficial to balance the optical imaging lens assembly and correct various aberrations.

In an exemplary embodiment, the optical imaging lens assembly may satisfy: RI≥50%, where RI is the relative illuminance corresponding to the maximal field-of-view of the optical imaging lens assembly. Satisfying RI≥50% is beneficial to meet the needs of the lens assembly for relative illuminance, improve the illuminance at the edge field, and enhance the shooting effect of the optical imaging lens assembly in a dark environment.

In an exemplary embodiment, the optical imaging lens assembly may satisfy: $V3+V4+V5<65$, where V3 is the Abbe number of the third lens, V4 is the Abbe number of the fourth lens, and V5 is the Abbe number of the fifth lens. More particularly, V3, V4 and V5 may further satisfy: $V3+V4+V5<62$. Satisfying $V3+V4+V5<65$ is beneficial to correct lens assembly chromatic aberration and reduce chromatic aberration.

In an exemplary embodiment, the optical imaging lens assembly may satisfy: $-5.0<f1/f2<-2.0$, where f1 is the effective focal length of the first lens, and f2 is the effective focal length of the second lens. More particularly, f1 and f2 may further satisfy: $-4.6<f1/f2<-2.1$. By satisfying $-5.0<f1/f2<-2.0$, the first lens and the second lens may have different refractive powers, and the separation of positive and negative refractive powers can be realized, so as to facilitate the correction of the Petzvan curvature of the image plane.

In an exemplary embodiment, the optical imaging lens assembly may satisfy: $1.5<|f5/f|<4.5$, where f5 is the effective focal length of the fifth lens, and f is the total effective focal length of the optical imaging lens assembly. More particularly, f5 and f may further satisfy: $1.7<|f5/f|<4.5$. By satisfying $1.5<|f5/f|<4.5$, the ratio of the effective focal length of the fifth lens to the total effective focal length of the lens assembly may be reasonably set, which is beneficial to correct the lateral chromatic aberration of the lens assembly.

In an exemplary embodiment, the optical imaging lens assembly may satisfy: $1.0<|f4/f|<2.5$, where f4 is the effective focal length of the fourth lens, and f is the total effective focal length of the optical imaging lens assembly. More particularly, f4 and f may further satisfy: $1.2<|f4/f|<2.3$. By satisfying $1.0<|f4/f|<2.5$, the ratio of the effective focal length of the fourth lens to the total effective focal length of the lens assembly may be set reasonably, which is beneficial to correct the astigmatism of the optical imaging lens assembly.

In an exemplary embodiment, the optical imaging lens assembly may satisfy: $1.5<|f3/f|<7.0$, where f3 is the effective focal length of the third lens, and f is the total effective focal length of the optical imaging lens assembly. More particularly, f3 and f may further satisfy: $1.8</f3/f|<6.8$. By satisfying $1.5<|f3/f|<7.0$, the ratio of the effective focal length of the third lens to the total effective focal length of the lens assembly may be set reasonably, which is beneficial to correct the spherical aberration of the lens assembly.

In an exemplary embodiment, the optical imaging lens assembly may satisfy: $2.5<(R1+R2)/(R1-R2)<5.5$, where R1 is the radius of curvature of the object side surface of the first lens, and R2 is the radius of curvature of the image side surface of the first lens. By satisfying $2.5<(R1+R2)/(R1-$ R2)<5.5, the shape of the first lens may be set reasonably, which is beneficial to increase the field-of-view of the lens assembly.

In an exemplary embodiment, the optical imaging lens assembly may satisfy: 2.5<|(R7+R8)/(R7−R8)|<6.5, where R7 is the radius of curvature of the object side surface of the fourth lens, R8 is the radius of curvature of the image side surface of the fourth lens. More particularly, R7 and R8 may further satisfy: 2.8<|(R7+R8)/(R7−R8)|<6.5. By satisfying 2.5<|(R7+R8)/(R7−R8)|<6.5, the shape of the fourth lens may be set reasonably, which is beneficial for balancing aberrations of the optical imaging lens assembly.

In an exemplary embodiment, the optical imaging lens assembly may satisfy: 0.5<R9/R10<2.5, where R9 is the radius of curvature of the object side surface of the fifth lens, and R10 is the radius of curvature of the image side surface of the fifth lens. More particularly, R9 and R10 may further satisfy: 0.8<R9/R10<2.4. By satisfying 0.5<R9/R10<2.5, the shape of the fifth lens may be set reasonably, which is beneficial to balance aberrations of the optical imaging lens assembly, and is beneficial to reduce ghost images.

In an exemplary embodiment, the optical imaging lens assembly may satisfy: −2.0<f2/R4<−1.0, where f2 is the effective focal length of the second lens, and R4 is the radius of curvature of the image side surface of the second lens. More particularly, f2 and R4 may further satisfy: −2.0<f2/R4<−1.3. By satisfying −2.0<f2/R4<−1.0, the shape of the second lens may be set reasonably, which is beneficial to balance aberrations and ensure the machinability of the lens assembly.

In an exemplary embodiment, the optical imaging lens assembly may satisfy: 1.0<|f3/R6|<3.0, where f3 is the effective focal length of the third lens, and R6 is the radius of curvature of the image side surface of the third lens. More particularly, f3 and R6 may further satisfy: 1.2<|f3/R6|<2.7. By satisfying 1.0<|f3/R6|<3.0, the shape of the third lens may be set reasonably, which is beneficial to reduce ghost images, and is beneficial to rationally distribute the refractive power of the third lens.

In an exemplary embodiment, the optical imaging lens assembly may satisfy: 1.0<T12/CT1<3.0, where CT1 is the central thickness of the first lens along the optical axis, and T12 is a spaced interval between the first lens and the second lens along the optical axis. More particularly, T12 and CT1 may further satisfy: 1.1<T12/CT1<2.9. Satisfying 1.0<T12/CT1<3.0 is beneficial to improve the machinability of the optical imaging lens assembly.

In an exemplary embodiment, the optical imaging lens assembly may satisfy: 6.0<CT2/T23<8.6, where CT2 is the central thickness of the second lens along the optical axis, and T23 is a spaced interval between the second lens and the third lens along the optical axis. Satisfying 6.0<CT2/T23<8.6 is beneficial to the assembly of each lens, and is beneficial to reduce ghost images.

In an exemplary embodiment, the optical imaging lens assembly may satisfy: 1.5<T34/T45<8.0, where T34 is a spaced interval between the third lens and the fourth lens along the optical axis, and T45 is a spaced interval between the fourth lens and the fifth lens along the optical axis. More particularly, T34 and T45 may further satisfy: 1.5<T34/T45<7.7. Satisfying 1.5<T34/T45<8.0 can reduce the influence of ghost images while ensuring the miniaturization of the lens assembly.

In an exemplary embodiment, the optical imaging lens assembly may satisfy: |fθ|<5%, where fθ is the distortion of the optical imaging lens assembly. Satisfying |fθ|<5% is beneficial for the accuracy of lens assembly linear scanning and is beneficial for improving of the accuracy of three-dimensional data collection.

In an exemplary embodiment, the optical imaging lens assembly may satisfy: f/EPD<2.1, where f is the total effective focal length of the optical imaging lens assembly, and EPD is the entrance pupil diameter of the optical imaging lens assembly. Satisfying f/EPD<2.1 is beneficial to improve the resolving power of the optical imaging lens assembly, increase the amount of light entering, and meet the requirements of high image quality.

In an exemplary embodiment, the optical imaging lens assembly may satisfy: 1.0 mm<ImgH/Tan(Semi-FOV)<2.0 mm, where ImgH is half of a diagonal length of the effective pixel area on the imaging plane of the optical imaging lens assembly, Semi-FOV is half of the maximal field-of-view of the optical imaging lens assembly. More particularly, ImgH and Semi-FOV may further satisfy: 1.7 mm<ImgH/Tan(Semi-FOV)<2.0 mm. Satisfying 1.0 mm<ImgH/Tan(Semi-FOV)<2.0 mm may cause barrel distortion of the lens assembly, make the actual image height deviate from the ideal Gaussian image height, so as to be closer to the imaging requirements of the optical imaging lens assembly in a scanning application.

In an exemplary embodiment, the optical imaging lens assembly according to the present disclosure further includes a diaphragm provided between the first lens and the second lens. Optionally, the above-mentioned optical imaging lens assembly may further include a filter for correcting color deviation.

In an exemplary embodiment, the optical imaging lens assembly according to the present disclosure may further include a protective glass disposed between the fifth lens and the imaging plane. The protective glass not only helps to improve the imaging quality of the optical imaging lens assembly, but also helps to protect the photosensitive element on the imaging plane.

The optical imaging lens assembly according to the above embodiments of the present disclosure may employ a plurality of lenses, such as five lenses as described above. By reasonably distributing the refractive powers, surface types, center thicknesses of the lenses, and the axial spacing distances between the lenses, the volume of the optical imaging lens assembly can be effectively reduced, the machinability of the optical imaging lens assembly can be improved, and the imaging lens assembly can be applied to portable electronic products. The optical imaging lens assembly configured as above has the advantages of miniaturization, wide range of application, structured light acceptable, and good imaging quality, and can well meet the use requirements of various portable electronic products in different shooting scenarios.

In an exemplary embodiment of the present disclosure, at least one of the surfaces of lenses is aspheric, that is, at least one of the object side surface of the first lens to the image side surface of the fifth lens is aspheric. The aspheric lens is characterized by a continuous change in curvature from the center of the lens to the periphery of the lens. Unlike a spherical lens having a constant curvature from the center of the lens to the periphery of the lens, the aspheric lens has a better radius of curvature characteristic, and has the advantages of improving distortion aberration and improving astigmatic aberration. With aspheric lens, the aberrations that occur during imaging may be eliminated as much as possible, and thus improving the image quality. Optionally, at least one of the object side surface and the image side surface of each of the first lens, the second lens, the third lens, the fourth lens and the fifth lens is aspheric. Optionally, both the object side surface and the image side surface of at least one of the first lens, the second lens, the third lens, the fourth lens and the fifth lens are aspheric. Optionally, at least one of the first lens, the second lens, the third lens, the fourth lens, and the fifth lens is a glass aspheric lens, which is beneficial for the optical imaging lens assembly to balance aberrations and to improve the temperature stability of the lens assembly. Optionally, the first lens, the second lens, the third lens, the fourth lens, and the fifth lens are all glass aspheric lenses, which is beneficial for the optical imaging lens assembly to balance aberrations and to improve the temperature stability of the lens assembly. In the present disclosure, at least one of the first lens to the fifth lens may be a lens made of plastic material.

However, it will be understood by those skilled in the art that the number of lenses constituting the optical imaging lens assembly may be varied to achieve the various results and advantages described in this specification without departing from the technical solution claimed by the present disclosure. For example, although the embodiment is described by taking five lenses as an example, the optical imaging lens assembly is not limited to include five lenses. The optical imaging lens assembly may also include other numbers of lenses if desired.

Some examples of an optical imaging lens assembly applicable to the above embodiments will be further described below with reference to the accompanying drawings.

Example 1

An optical imaging lens assembly according to example 1 of the present disclosure is described below with reference to FIG. 1 to FIG. 2E. FIG. 1 shows a schematic structural view of the optical imaging lens assembly according to example 1 of the present disclosure.

As shown in FIG. 1, the optical imaging lens assembly includes a first lens E1, a stop STO, a second lens E2, a third lens E3, a fourth lens E4, a fifth lens E5, an optical filter E6, a protective glass (not shown) and an imaging plane S13, which are sequentially arranged from an object side to an image side along an optical axis.

The first lens E1 has a negative refractive power, an object side surface S1 of the first lens is a convex surface, and an image side surface S2 of the first lens is a concave surface. The second lens E2 has a positive refractive power, an object side surface S3 of the second lens is a concave surface, and an image side surface S4 of the second lens is a convex surface. The third lens E3 has a negative refractive power, an object side surface S5 of the third lens is a convex surface, and an image side surface S6 of the third lens is a concave surface. The fourth lens E4 has a positive refractive power, an object side surface S7 of the fourth lens is a concave surface, and an image side surface S8 of the fourth lens is a convex surface. The fifth lens E5 has a negative refractive power, an object side surface S9 of the fifth lens is a convex surface, and an image side surface S10 of the fifth lens is a concave surface. The optical filter E6 has an object side surface S11 and an image side surface S12. Light from an object sequentially passes through the respective surfaces S1 to S12 and is finally imaged on the imaging plane S13.

Table 1 is a table illustrating basic parameters of the optical imaging lens assembly of example 1, wherein the units for the radius of curvature, the thickness/distance and the focal length are millimeter (mm).

TABLE 1

| Surface number | Surface type | Radius of curvature | Thickness/ Distance | Refractive index | Abbe number | Focal length | Conic coefficient |
|---|---|---|---|---|---|---|---|
| OBJ | Spherical | Infinite | Infinite | | | | |
| S1 | Aspheric | 3.4547 | 0.4200 | 1.64 | 20.4 | −14.08 | −13.8720 |
| S2 | Aspheric | 2.3742 | 0.5992 | | | | −7.1125 |
| STO | Spherical | Infinite | 0.1737 | | | | |
| S3 | Aspheric | −7.5814 | 0.8500 | 1.76 | 49.6 | 3.12 | 0.0000 |
| S4 | Aspheric | −1.8932 | 0.1000 | | | | 0.8424 |
| S5 | Aspheric | 69.8641 | 0.4105 | 1.64 | 20.4 | −18.33 | 90.0000 |
| S6 | Aspheric | 9.9563 | 0.7610 | | | | −90.0000 |
| S7 | Aspheric | −1.8003 | 0.4393 | 1.64 | 20.4 | 4.78 | 0.2749 |
| S8 | Aspheric | −1.2369 | 0.1000 | | | | −3.4761 |
| S9 | Aspheric | 2.6911 | 1.0832 | 1.64 | 20.4 | −9.12 | −13.8877 |
| S10 | Aspheric | 1.5503 | 0.6482 | | | | −0.5984 |
| S11 | Spherical | Infinite | 0.2100 | 1.51 | 64.2 | | |
| S12 | Spherical | Infinite | 0.6050 | | | | |
| S13 | Spherical | Infinite | | | | | |

In this example, a total effective focal length f of the optical imaging lens assembly satisfies f=2.75 mm, a total length TTL (that is, a distance from the object side surface S1 of the first lens E1 to the imaging plane S13 along the optical axis) of the optical imaging lens assembly satisfies TTL=6.40 mm, half of a diagonal length ImgH of an effective pixel area on the imaging plane S13 of the optical imaging lens assembly satisfies ImgH=2.50 mm, and half of a maximal field-of-view Semi-FOV of the optical imaging lens assembly satisfies Semi-FOV=53.6°.

In example 1, both the object side surface and the image side surface of any one of the first lens E1 to the fifth lens E5 are aspheric. The surface type x of each aspheric lens may be defined by using, but not limited to, the following aspheric formula:

$$x = \frac{ch^2}{1 + \sqrt{1-(k+1)c^2h^2}} + \sum A_i h^i \qquad (1)$$

Where, x is the sag—the axis-component of the displacement of the surface from the aspheric vertex, when the surface is at height h from the optical axis: c is a paraxial curvature of the aspheric surface, c=1/R (that is, the paraxial curvature c is reciprocal of the radius of curvature R in the above Table 1): k is a conic coefficient: Ai is a correction coefficient for the i-th order of the aspheric surface. Table 2 below shows high-order coefficients $A_4$, $A_6$, $A_8$, $A_{10}$, $A_{12}$, $A_{14}$, $A_{16}$, $A_{18}$ and $A_{20}$ applicable to each aspheric surface S1 to S10 in example 1.

TABLE 2

| Surface number | $A_4$ | $A_6$ | $A_8$ | $A_{10}$ | $A_{12}$ | $A_{14}$ | $A_{16}$ | $A_{18}$ | $A_{20}$ |
|---|---|---|---|---|---|---|---|---|---|
| S1 | 4.6857E−02 | −2.5775E−02 | 1.4754E−02 | −1.5748E−02 | 6.7631E−03 | −1.7341E−03 | 1.1275E−04 | 0.0000E+00 | 0.0000E+00 |
| S2 | 7.8168E−02 | −7.4625E−02 | 1.1961E−01 | −2.7676E−01 | 2.6837E−01 | −1.4138E−01 | 3.4534E−02 | 0.0000E+00 | 0.0000E+00 |
| S3 | −6.6150E−02 | −4.7897E−01 | 5.0662E+00 | −3.6680E+01 | 1.5974E+02 | −4.2753E+02 | 6.8733E+02 | −6.1047E+02 | 2.3086E+02 |
| S4 | 3.4404E−02 | −1.0874E−01 | 2.5270E−01 | −6.8160E−01 | 1.4169E+00 | −1.9268E+00 | 1.6034E+00 | −7.4507E−01 | 1.4951E−01 |
| S5 | 1.2258E−02 | −3.1509E−02 | −1.1193E−02 | 1.0014E−01 | −1.4357E−01 | 1.0697E−01 | −4.5524E−02 | 1.0714E−02 | −1.1254E−03 |
| S6 | −5.0280E−02 | 3.7251E−02 | −6.3714E−02 | 5.7012E−02 | −3.5763E−02 | 1.1300E−02 | 4.7476E−04 | −1.0784E−03 | 1.4878E−04 |
| S7 | 1.0583E−01 | 2.7236E−02 | −1.5029E−01 | 2.2508E−01 | −1.3873E−01 | 7.0084E−03 | 3.1210E−02 | −1.3008E−02 | 1.5728E−03 |
| S8 | −7.9232E−02 | 6.5012E−02 | −9.3389E−03 | −9.9382E−02 | 2.0601E−01 | −1.8647E−01 | 8.6130E−02 | −1.9445E−02 | 1.6646E−03 |
| S9 | 4.6220E−02 | −1.1170E−01 | 1.0417E−01 | −5.8140E−02 | 1.7487E−02 | −1.3495E−03 | −8.1729E−04 | 2.6136E−04 | −2.4549E−05 |
| S10 | −1.7508E−01 | 8.9296E−02 | −5.0950E−02 | 2.3180E−02 | −7.9602E−03 | 1.9231E−03 | −3.0642E−04 | 2.8756E−05 | −1.2039E−06 |

Figures 2A, 2B:
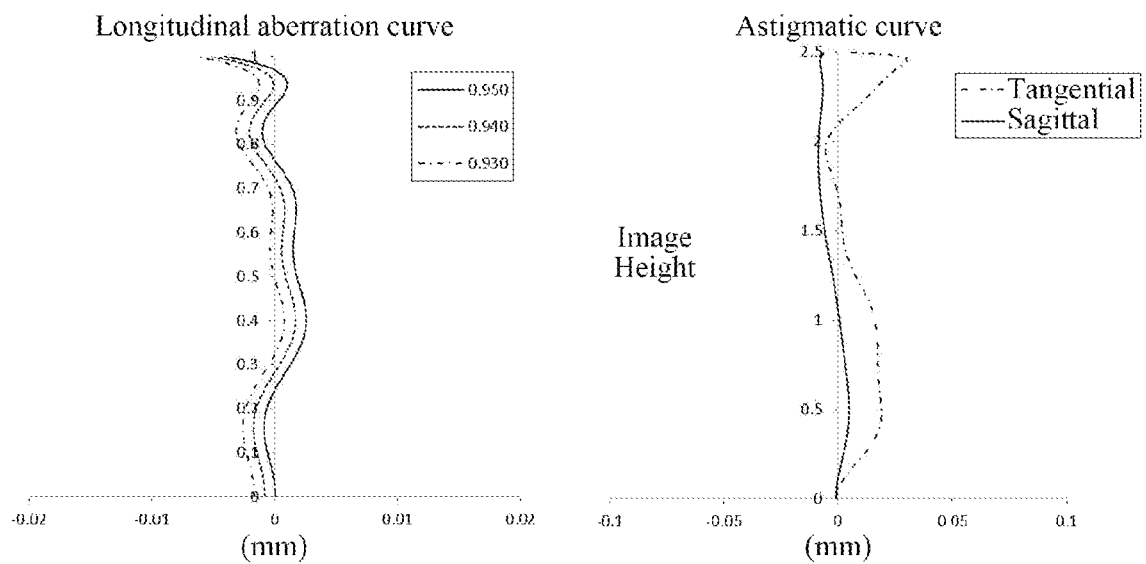
FIGS. 2A-2E respectively show a longitudinal aberration curve, an astigmatism curve, a distortion curve, a lateral color curve, and a relative illuminance curve of the optical imaging lens assembly of Example 1.
Figure 2C:
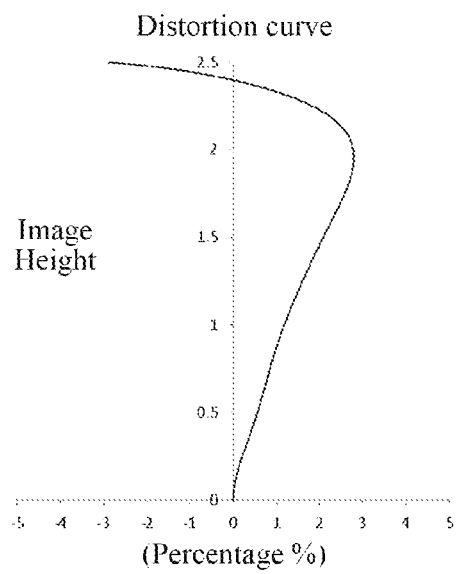
Figure 2D:
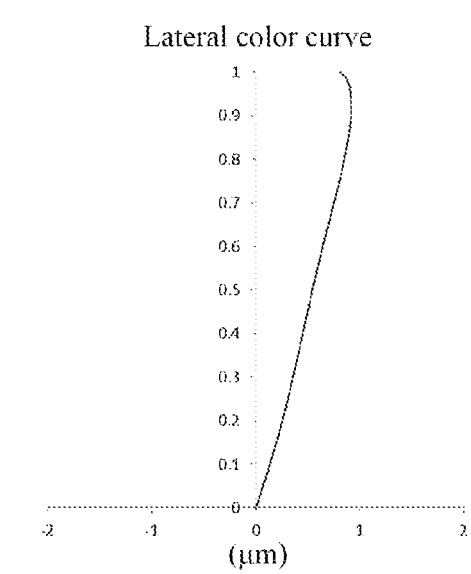
Figure 2E:
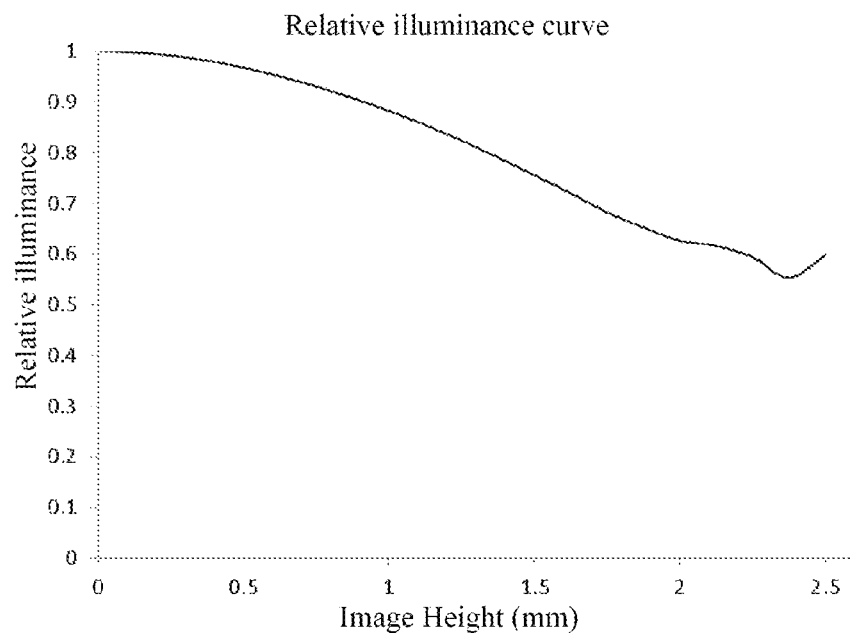

FIG. 2A shows a longitudinal aberration curve of the optical imaging lens assembly according to example 1, representing deviations of focal points converged by light of different wavelengths after passing through the lens assembly. FIG. 2B shows an astigmatic curve of the optical imaging lens assembly according to example 1, representing a curvature of a tangential plane and a curvature of a sagittal plane. FIG. 2C shows a distortion curve of the optical imaging lens assembly according to example 1, representing amounts of distortion corresponding to different image heights. FIG. 2D shows a lateral color curve of the optical imaging lens assembly according to example 1, representing deviations of different image heights on an imaging plane after light passes through the lens assembly. FIG. 2E shows a relative illuminance curve of the optical imaging lens assembly according to example 1, representing the relative illuminance values corresponding to different image heights. It can be seen from FIG. 2A to FIG. 2E that the optical imaging lens assembly provided in example 1 can achieve good image quality.

Example 2

An optical imaging lens assembly according to Example 2 of the present disclosure is described below with reference to FIG. 3 to FIG. 4E. In this example and the following examples, for the sake of brevity, some descriptions similar to those in Example 1 will be omitted. FIG. 3 shows a schematic structural view of the optical imaging lens assembly according to Example 2 of the present disclosure.

As shown in FIG. 3, the optical imaging lens assembly includes a first lens E1, a stop STO, a second lens E2, a third lens E3, a fourth lens E4, a fifth lens E5, an optical filter E6, a protective glass (not shown) and an imaging plane S13, which are sequentially arranged from an object side to an image side.

The first lens E1 has a negative refractive power, an object side surface S1 of the first lens is a convex surface, and an image side surface S2 of the first lens is a concave surface. The second lens E2 has a positive refractive power, an object side surface S3 of the second lens is a concave surface, and an image side surface S4 of the second lens is a convex surface. The third lens E3 has a positive refractive power, an object side surface S5 of the third lens is a convex surface, and an image side surface S6 of the third lens is a convex surface. The fourth lens E4 has a negative refractive power, an object side surface S7 of the fourth lens is a concave surface, and an image side surface S8 of the fourth lens is a convex surface. The fifth lens E5 has a positive refractive power, an object side surface S9 of the fifth lens is a convex surface, and an image side surface S10 of the fifth lens is a concave surface. The optical filter E6 has an object side surface S11 and an image side surface S12. Light from an object sequentially passes through the respective surfaces S1 to S12 and is finally imaged on the imaging plane S13.

In this example, the total effective focal length f of the optical imaging lens assembly satisfies f=2.74 mm, the total length TTL of the optical imaging lens assembly satisfies TTL=6.40 mm, half of the diagonal length ImgH of the effective pixel area on the imaging plane S13 of the optical imaging lens assembly satisfies ImgH=2.50 mm, and half of the maximal field-of-view Semi-FOV of the optical imaging lens assembly satisfies Semi-FOV=53.62°.

Table 3 is a table showing basic parameters of the optical imaging lens assembly of example 2, wherein the units for the radius of curvature, the thickness/distance and the focal length are millimeter (mm). Table 4 shows the higher-order coefficients that can be used for each aspheric surface in Example 2, where each aspheric surface type can be defined by the formula (1) given in Example 1 above.

TABLE 3

| Surface number | Surface type | Radius of curvature | Thickness/ Distance | Material Refractive index | Abbe number | Focal length | Conic coefficient |
|---|---|---|---|---|---|---|---|
| OBJ | Spherical | Infinite | Infinite | | | | |
| S1 | Aspheric | 2.9730 | 0.4283 | 1.64 | 20.4 | −8.41 | −11.4529 |
| S2 | Aspheric | 1.8034 | 0.4966 | | | | −4.5747 |
| STO | Spherical | Infinite | 0.1000 | | | | |
| S3 | Aspheric | −5.5299 | 0.8500 | 1.76 | 49.6 | 3.78 | 0.0000 |
| S4 | Aspheric | −2.0146 | 0.1221 | | | | 1.2802 |
| S5 | Aspheric | 24.1803 | 0.7219 | 1.64 | 20.4 | 5.75 | −90.0000 |

TABLE 3-continued

| Surface number | Surface type | Radius of curvature | Thickness/ Distance | Material Refractive index | Abbe number | Focal length | Conic coefficient |
|---|---|---|---|---|---|---|---|
| S6 | Aspheric | −4.2508 | 0.6504 | | | | 4.7600 |
| S7 | Aspheric | −1.7654 | 0.4938 | 1.64 | 20.4 | −6.06 | 0.2503 |
| S8 | Aspheric | −3.6176 | 0.2066 | | | | −1.8408 |
| S9 | Aspheric | 1.4129 | 0.9481 | 1.64 | 20.4 | 6.52 | −8.6845 |
| S10 | Aspheric | 1.5859 | 0.5671 | | | | −0.5898 |
| S11 | Spherical | Infinite | 0.2100 | 1.51 | 64.2 | | |
| S12 | Spherical | Infinite | 0.6050 | | | | |
| S13 | Spherical | Infinite | | | | | |

TABLE 4

| Surface number | $A_4$ | $A_6$ | $A_8$ | $A_{10}$ | $A_{12}$ | $A_{14}$ | $A_{16}$ | $A_{18}$ | $A_{20}$ |
|---|---|---|---|---|---|---|---|---|---|
| S1 | 5.4401E−02 | −5.5841E−02 | 9.2067E−02 | −1.4329E−01 | 1.3359E−01 | −6.8319E−02 | 1.4154E−02 | 0.0000E+00 | 0.0000E+00 |
| S2 | 1.0295E−01 | −1.0083E−01 | 2.4369E−01 | −7.6586E−01 | 1.3269E+00 | −1.3546E+00 | 5.5573E−01 | 0.0000E+00 | 0.0000E+00 |
| S3 | −7.0296E−02 | −1.0870E+00 | 1.5162E+01 | −1.2684E+02 | 6.3555E+02 | −1.9527E+03 | 3.6000E+03 | −3.6556E+03 | 1.5715E+03 |
| S4 | −2.2818E−02 | −6.0442E−02 | 3.0262E−01 | −8.8341E−01 | 1.8155E+00 | −2.5881E+00 | 2.3533E+00 | −1.2000E+00 | 2.5945E−01 |
| S5 | −1.2311E−03 | −4.9406E−02 | 1.7398E−01 | −2.8269E−01 | 2.5216E−01 | −1.3485E−01 | 4.2904E−02 | −6.9843E−03 | 3.5052E−04 |
| S6 | −5.6238E−03 | −2.3977E−02 | −2.2900E−02 | 1.2852E−01 | −2.2015E−01 | 1.9162E−01 | −9.2730E−02 | 2.4105E−02 | −2.6391E−03 |
| S7 | 1.4239E−01 | −1.5511E−01 | 1.1938E−01 | 7.0974E−02 | −1.9230E−01 | 1.3840E−01 | −4.3778E−02 | 5.2888E−03 | −2.0882E−05 |
| S8 | −1.8809E−01 | 3.2799E−01 | −5.0823E−01 | 6.4864E−01 | −5.5098E−01 | 3.0259E−01 | −1.0514E−01 | 2.1439E−02 | −1.9795E−03 |
| S9 | 2.5721E−02 | −1.6337E−01 | 1.7776E−01 | −1.1382E−01 | 4.8473E−02 | −1.3895E−02 | 2.5087E−03 | −2.3766E−04 | 6.9873E−06 |
| S10 | −8.4338E−02 | −6.4963E−02 | 8.8606E−02 | −5.6276E−02 | 2.1927E−02 | −5.4619E−03 | 8.4121E−04 | −7.2539E−05 | 2.6567E−06 |

Figure 4C:
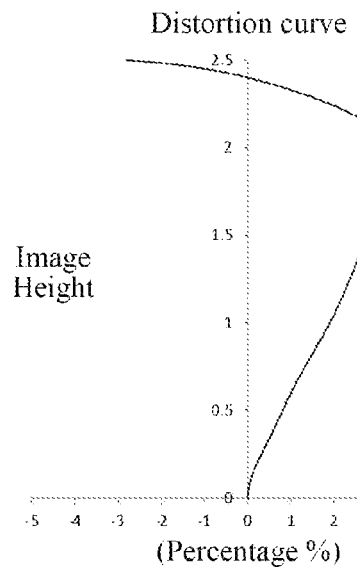
Figure 4D:
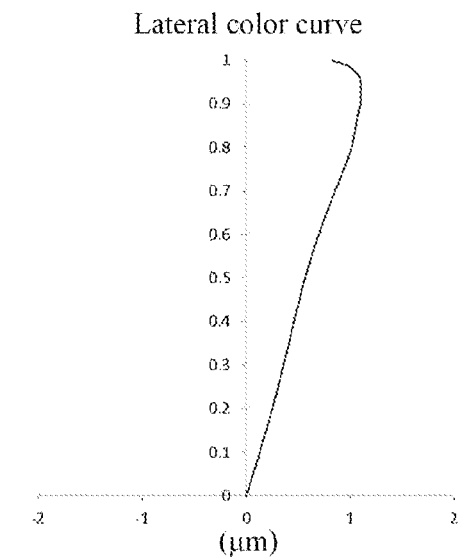
Figure 4E:
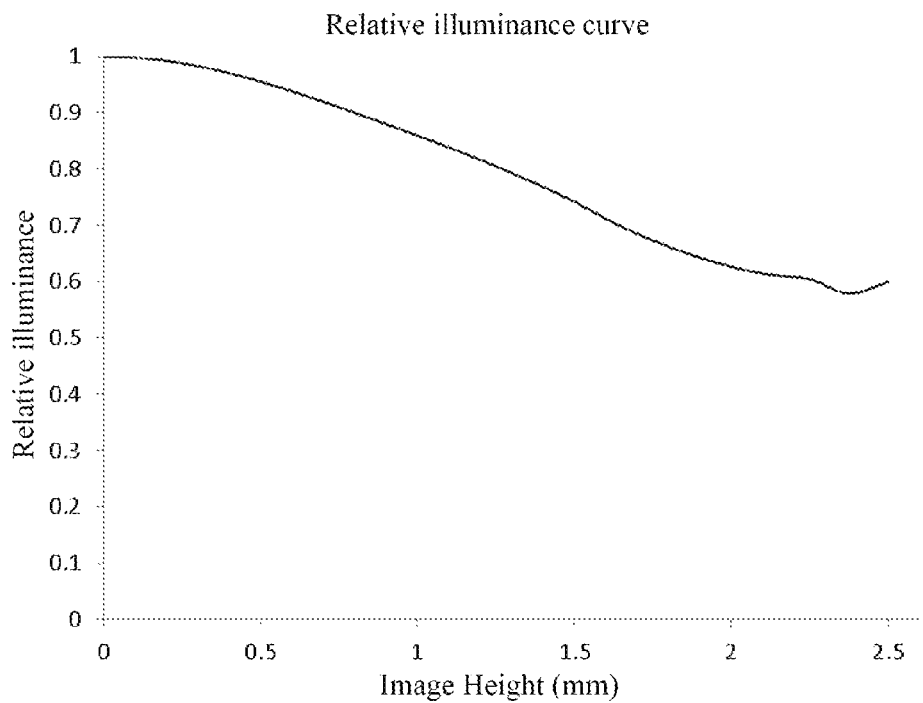

FIG. 4A shows a longitudinal aberration curve of the optical imaging lens assembly according to example 2, representing deviations of focal points converged by light of different wavelengths after passing through the lens assembly. FIG. 4B shows an astigmatic curve of the optical imaging lens assembly according to example 2, representing a curvature of a tangential plane and a curvature of a sagittal plane. FIG. 4C shows a distortion curve of the optical imaging lens assembly according to example 2, representing amounts of distortion corresponding to different image heights. FIG. 4D shows a lateral color curve of the optical imaging lens assembly according to example 2, representing deviations of different image heights on an imaging plane after light passes through the lens assembly. FIG. 4E shows a relative illuminance curve of the optical imaging lens assembly according to example 2, representing the relative illuminance values corresponding to different image heights. It can be seen from FIG. 4A to FIG. 4E that the optical imaging lens assembly provided in example 2 can achieve good image quality.

Example 3

Figure 5:
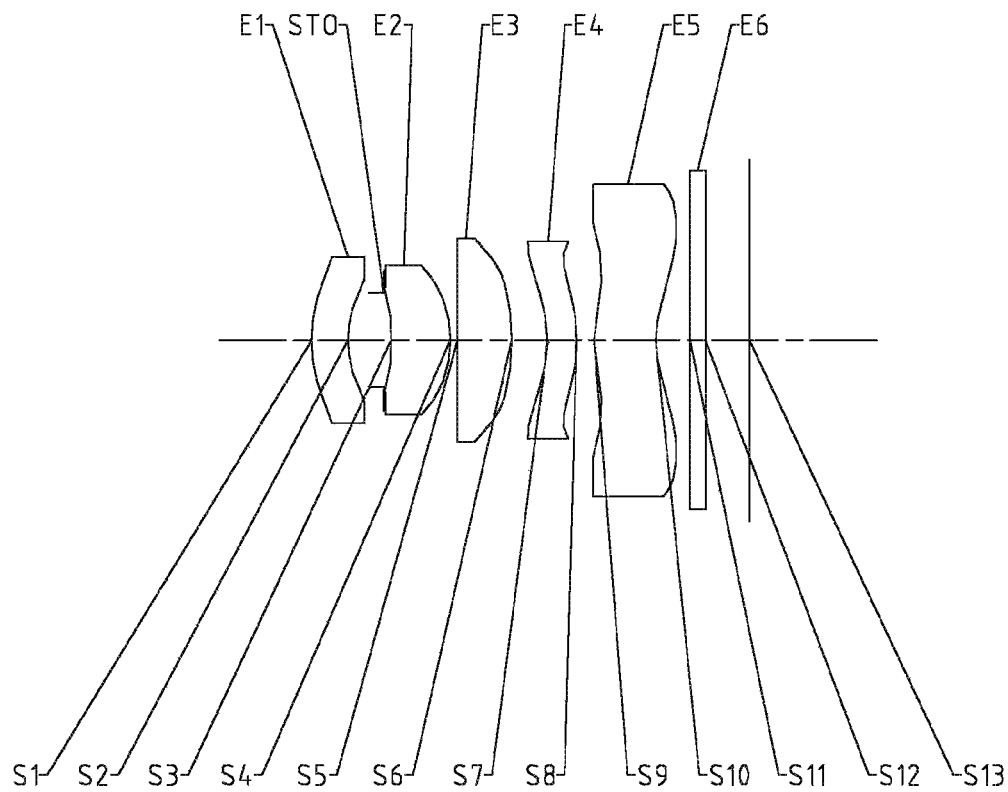
FIG. 5 shows a schematic structural diagram of an optical imaging lens assembly according to Example 3 of the present disclosure.

An optical imaging lens assembly according to Example 3 of the present disclosure is described below with reference to FIG. 5 to FIG. 6E. FIG. 5 shows a schematic structural view of the optical imaging lens assembly according to Example 3 of the present disclosure.

As shown in FIG. 5, the optical imaging lens assembly includes a first lens E1, a stop STO, a second lens E2, a third lens E3, a fourth lens E4, a fifth lens E5, an optical filter E6, a protective glass (not shown) and an imaging plane S13, which are sequentially arranged from an object side to an image side.

The first lens E1 has a negative refractive power, an object side surface S1 of the first lens is a convex surface, and an image side surface S2 of the first lens is a concave surface. The second lens E2 has a positive refractive power, an object side surface S3 of the second lens is a concave surface, and an image side surface S4 of the second lens is a convex surface. The third lens E3 has a positive refractive power, an object side surface S5 of the third lens is a convex surface, and an image side surface S6 of the third lens is a convex surface. The fourth lens E4 has a negative refractive power, an object side surface S7 of the fourth lens is a concave surface, and an image side surface S8 of the fourth lens is a convex surface. The fifth lens E5 has a positive refractive power, an object side surface S9 of the fifth lens is a convex surface, and an image side surface S10 of the fifth lens is a concave surface. The optical filter E6 has an object side surface S11 and an image side surface S12. Light from an object sequentially passes through the respective surfaces S1 to S12 and is finally imaged on the imaging plane S13.

In this example, the total effective focal length f of the optical imaging lens assembly satisfies f=2.75 mm, the total length TTL of the optical imaging lens assembly satisfies TTL=6.00 mm, half of the diagonal length ImgH of the effective pixel area on the imaging plane S13 of the optical imaging lens assembly satisfies ImgH=2.50 mm, and half of the maximal field-of-view Semi-FOV of the optical imaging lens assembly satisfies Semi-FOV=53.63°.

Table 5 is a table showing basic parameters of the optical imaging lens assembly of example 3, wherein the units for the radius of curvature, the thickness/distance and the focal length are millimeter (mm). Table 6 shows the higher-order coefficients that can be used for each aspheric surface in Example 3, where each aspheric surface type can be defined by the formula (1) given in Example 1 above.

TABLE 5

| Surface number | Surface type | Radius of curvature | Thickness/ Distance | Material Refractive index | Abbe number | Focal length | Conic coefficient |
|---|---|---|---|---|---|---|---|
| OBJ | Spherical | Infinite | Infinite | | | | |
| S1 | Aspheric | 2.2556 | 0.4962 | 1.64 | 20.4 | −9.98 | −6.6663 |
| S2 | Aspheric | 1.5217 | 0.4921 | | | | −3.6045 |
| STO | Spherical | Infinite | 0.1000 | | | | |
| S3 | Aspheric | −5.1686 | 0.8103 | 1.76 | 49.6 | 3.45 | 0.0000 |
| S4 | Aspheric | −1.8560 | 0.1000 | | | | 1.2365 |
| S5 | Aspheric | 15.3674 | 0.7400 | 1.64 | 20.4 | 5.19 | −90.0000 |
| S6 | Aspheric | −4.1171 | 0.4925 | | | | 5.5930 |
| S7 | Aspheric | −1.7725 | 0.4000 | 1.64 | 20.4 | −6.00 | 0.1061 |
| S8 | Aspheric | −3.6050 | 0.2397 | | | | −14.6857 |
| S9 | Aspheric | 1.4391 | 0.8446 | 1.64 | 20.4 | 11.96 | −9.5809 |
| S10 | Aspheric | 1.3708 | 0.4697 | | | | −0.6405 |
| S11 | Spherical | Infinite | 0.2100 | 1.51 | 64.2 | | |
| S12 | Spherical | Infinite | 0.6050 | | | | |
| S13 | Spherical | Infinite | | | | | |

TABLE 6

| Surface number | $A_4$ | $A_6$ | $A_8$ | $A_{10}$ | $A_{12}$ | $A_{14}$ | $A_{16}$ | $A_{18}$ | $A_{20}$ |
|---|---|---|---|---|---|---|---|---|---|
| S1 | 6.5474E−02 | −4.2246E−02 | 3.7893E−02 | −4.0535E−02 | 2.4446E−02 | −7.3105E−03 | 1.9175E−04 | 0.0000E+00 | 0.0000E+00 |
| S2 | 1.1934E−01 | −7.8578E−02 | 8.1435E−02 | −2.5424E−01 | 3.1562E−01 | −3.6085E−01 | 1.5183E−01 | 0.0000E+00 | 0.0000E+00 |
| S3 | −1.0058E−01 | −1.3747E+00 | 2.2022E+01 | −2.0860E+02 | 1.1745E+03 | −4.0380E+03 | 8.3066E+03 | −9.3906E+03 | 4.4860E+03 |
| S4 | −8.9777E−02 | 1.8074E−01 | −3.8587E−01 | 5.2925E−01 | −1.3622E−01 | −9.1911E−01 | 1.6501E+00 | −1.1693E+00 | 3.1178E−01 |
| S5 | −8.4066E−02 | 2.1878E−01 | −4.6649E−01 | 7.3644E−01 | −8.8530E−01 | 7.3092E−01 | −3.7227E−01 | 1.0483E−01 | −1.2545E−02 |
| S6 | −3.7483E−02 | 4.1000E−02 | −1.2455E−01 | 1.6945E−01 | −2.3328E−01 | 2.4200E−01 | −1.4620E−01 | 4.6393E−02 | −6.0219E−03 |
| S7 | −1.5208E−02 | 5.8218E−01 | −1.4422E+00 | 2.4991E+00 | −3.1219E+00 | 2.5768E+00 | −1.2912E+00 | 3.5391E−01 | −4.0747E−02 |
| S8 | −5.4274E−01 | 1.5964E+00 | −3.0277E+00 | 4.3068E+00 | −4.3655E+00 | 2.9813E+00 | −1.2897E+00 | 3.1959E−01 | −3.4704E−02 |
| S9 | −2.6056E−01 | 3.9709E−01 | −5.3498E−01 | 5.1849E−01 | −3.4766E−01 | 1.5405E−01 | −4.2477E−02 | 6.6120E−03 | −4.4792E−04 |
| S10 | −3.0023E−01 | 2.2866E−01 | −1.7347E−01 | 1.0055E−01 | −4.2002E−02 | 1.1948E−02 | −2.1768E−03 | 2.2769E−04 | −1.0389E−05 |

Figures 6A, 6B:
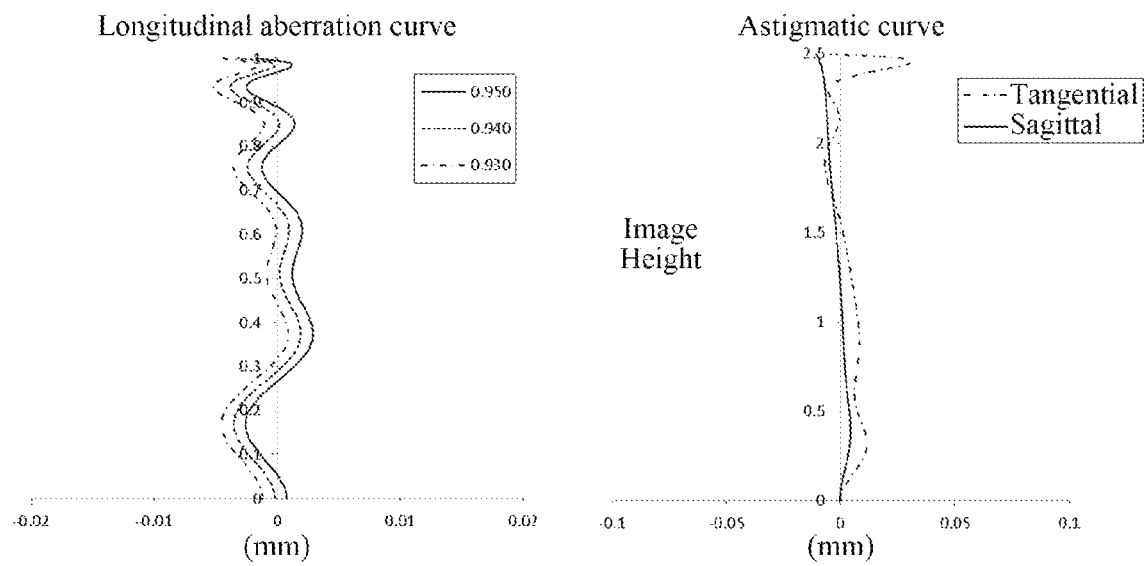
FIGS. 6A-6E respectively show a longitudinal aberration curve, an astigmatism curve, a distortion curve, a lateral color curve, and a relative illuminance curve of the optical imaging lens assembly of Example 3.
Figure 6C:
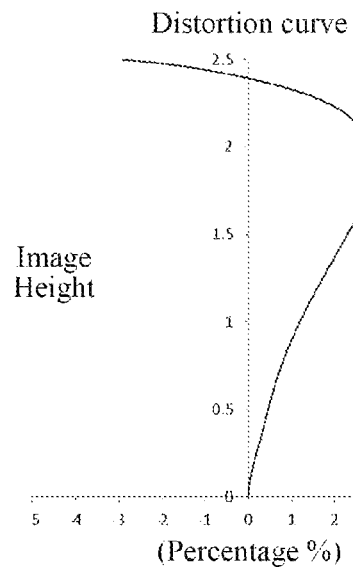
Figure 6D:
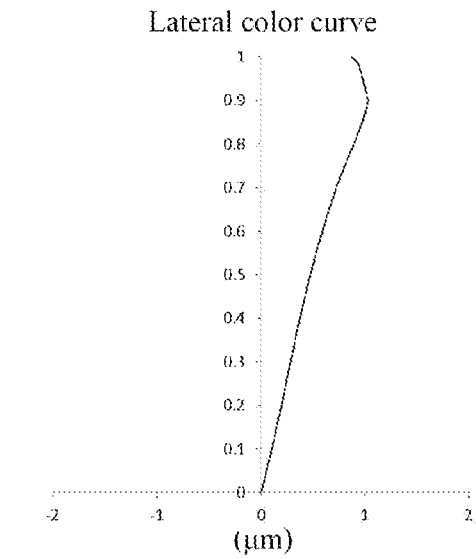
Figure 6E:
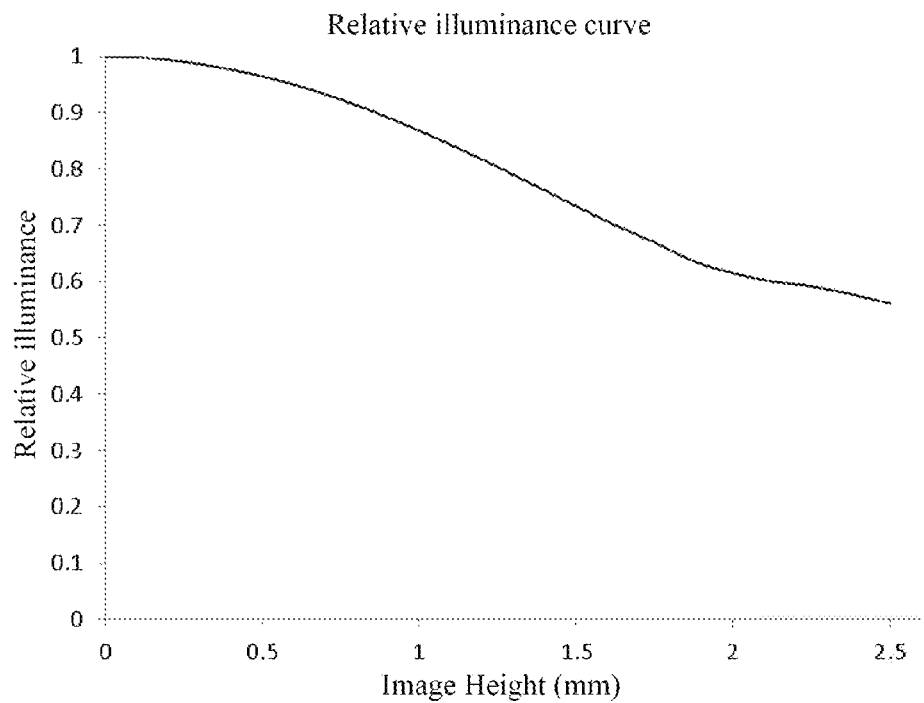

FIG. 6A shows a longitudinal aberration curve of the optical imaging lens assembly according to example 3, representing deviations of focal points converged by light of different wavelengths after passing through the lens assembly. FIG. 6B shows an astigmatic curve of the optical imaging lens assembly according to example 3, representing a curvature of a tangential plane and a curvature of a sagittal plane. FIG. 6C shows a distortion curve of the optical imaging lens assembly according to example 3, representing amounts of distortion corresponding to different image heights. FIG. 6D shows a lateral color curve of the optical imaging lens assembly according to example 3, representing deviations of different image heights on an imaging plane after light passes through the lens assembly. FIG. 6E shows a relative illuminance curve of the optical imaging lens assembly according to example 3, representing the relative illuminance values corresponding to different image heights. It can be seen from FIG. 6A to FIG. 6E that the optical imaging lens assembly provided in example 3 can achieve good image quality.

Example 4

An optical imaging lens assembly according to Example 4 of the present disclosure is described below with reference to FIG. 7 to FIG. 8E. FIG. 7 shows a schematic structural view of the optical imaging lens assembly according to Example 4 of the present disclosure.

As shown in FIG. 7, the optical imaging lens assembly includes a first lens E1, a stop STO, a second lens E2, a third lens E3, a fourth lens E4, a fifth lens E5, an optical filter E6, a protective glass (not shown) and an imaging plane S13, which are sequentially arranged from an object side to an image side.

The first lens E1 has a negative refractive power, an object side surface S1 of the first lens is a convex surface, and an image side surface S2 of the first lens is a concave surface. The second lens E2 has a positive refractive power, an object side surface S3 of the second lens is a concave surface, and an image side surface S4 of the second lens is a convex surface. The third lens E3 has a negative refractive power, an object side surface S5 of the third lens is a concave surface, and an image side surface S6 of the third lens is a convex surface. The fourth lens E4 has a positive refractive power, an object side surface S7 of the fourth lens is a concave surface, and an image side surface S8 of the fourth lens is a convex surface. The fifth lens E5 has a negative refractive power, an object side surface S9 of the fifth lens is a convex surface, and an image side surface S10 of the fifth lens is a concave surface. The optical filter E6 has an object side surface S11 and an image side surface S12. Light from an object sequentially passes through the respective surfaces S1 to S12 and is finally imaged on the imaging plane S13.

In this example, the total effective focal length f of the optical imaging lens assembly satisfies f=2.75 mm, the total length TTL of the optical imaging lens assembly satisfies TTL=6.40 mm, half of the diagonal length ImgH of the effective pixel area on the imaging plane S13 of the optical imaging lens assembly satisfies ImgH=2.50 mm, and half of the maximal field-of-view Semi-FOV of the optical imaging lens assembly satisfies Semi-FOV=53.60°.

Table 7 is a table showing basic parameters of the optical imaging lens assembly of example 4, wherein the units for the radius of curvature, the thickness/distance and the focal length are millimeter (mm). Table 8 shows the higher-order coefficients that can be used for each aspheric surface in Example 4, where each aspheric surface type can be defined by the formula (1) given in Example 1 above.

TABLE 7

| Surface number | Surface type | Radius of curvature | Thickness/ Distance | Material Refractive index | Abbe number | Focal length | Conic coefficient |
|---|---|---|---|---|---|---|---|
| OBJ | Spherical | Infinite | Infinite | | | | |
| S1 | Aspheric | 3.1836 | 0.3363 | 1.64 | 20.4 | −9.98 | −14.8019 |
| S2 | Aspheric | 2.0324 | 0.7350 | | | | −5.9983 |
| STO | Spherical | Infinite | 0.1944 | | | | |
| S3 | Aspheric | −18.8553 | 0.8057 | 1.76 | 49.6 | 2.75 | 0.0000 |
| S4 | Aspheric | −1.9106 | 0.1320 | | | | 0.8622 |
| S5 | Aspheric | −2.8769 | 0.3893 | 1.64 | 20.4 | −12.28 | −38.6078 |
| S6 | Aspheric | −4.7977 | 0.7381 | | | | 7.3680 |
| S7 | Aspheric | −1.7902 | 0.3487 | 1.64 | 20.4 | 3.48 | 0.2978 |
| S8 | Aspheric | −1.0639 | 0.4668 | | | | −3.9516 |
| S9 | Aspheric | 3.6914 | 0.6630 | 1.64 | 20.4 | −4.95 | −1.6748 |
| S10 | Aspheric | 1.5788 | 0.7757 | | | | −0.5875 |
| S11 | Spherical | Infinite | 0.2100 | 1.51 | 64.2 | | |
| S12 | Spherical | Infinite | 0.6050 | | | | |
| S13 | Spherical | Infinite | | | | | |

TABLE 8

| Surface number | $A_4$ | $A_6$ | $A_8$ | $A_{10}$ | $A_{12}$ | $A_{14}$ | $A_{16}$ | $A_{18}$ | $A_{20}$ |
|---|---|---|---|---|---|---|---|---|---|
| S1 | 5.6867E−02 | −4.8725E−02 | 3.7887E−02 | −4.0206E−02 | 2.4493E−02 | −9.3663E−03 | 1.6532E−03 | 0.0000E+00 | 0.0000E+00 |
| S2 | 9.0894E−02 | −7.5991E−02 | 4.7203E−02 | −7.7765E−02 | 1.1157E−02 | 2.5709E−02 | −8.4275E−03 | 0.0000E+00 | 0.0000E+00 |
| S3 | −5.8643E−02 | −5.3870E−01 | 5.0410E+00 | −3.1791E+01 | 1.2069E+02 | −2.8184E+02 | 3.9414E+02 | −3.0319E+02 | 9.8841E+01 |
| S4 | 8.6286E−02 | −3.1475E−01 | 8.9024E−01 | −1.7530E+00 | 2.1760E+00 | −1.7859E+00 | 9.7462E−01 | −3.2762E−01 | 5.3654E−02 |
| S5 | −4.8985E−02 | −1.0092E−01 | 5.4438E−01 | −9.1463E−01 | 7.0408E−01 | −2.3933E−01 | 9.1612E−03 | 1.5037E−02 | −2.8898E−03 |
| S6 | 1.1404E−02 | −1.3815E−01 | 2.1101E−01 | −3.2173E−02 | −2.8202E−01 | 3.4896E−01 | −1.9033E−01 | 5.1722E−02 | −5.7002E−03 |
| S7 | 1.3997E−01 | 3.3553E−02 | −5.7677E−01 | 1.0831E+00 | −9.0663E−01 | 3.7595E−01 | −6.4630E−02 | −1.2813E−03 | 1.1930E−03 |
| S8 | −5.5670E−02 | 1.4506E−01 | −4.0305E−01 | 4.1008E−01 | −4.4737E−02 | −1.9000E−01 | 1.3868E−01 | −3.9282E−02 | 4.0848E−03 |
| S9 | 1.9505E−01 | −3.7692E−01 | 3.5142E−01 | −2.0328E−01 | 7.4347E−02 | −1.6522E−02 | 1.9398E−03 | −6.4720E−05 | −4.8600E−06 |
| S10 | −9.1598E−03 | −1.6790E−01 | 1.8161E−01 | −1.1083E−01 | 4.2621E−02 | −1.0505E−02 | 1.6011E−03 | −1.3664E−04 | 4.9601E−06 |

Figure 8C:
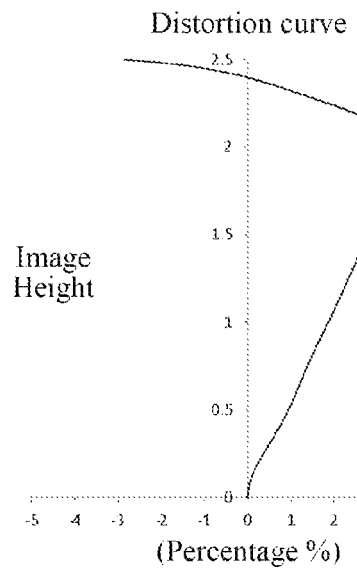
Figure 8D:
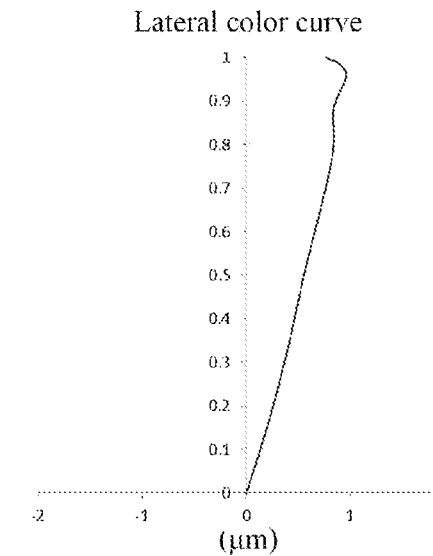
Figure 8E:
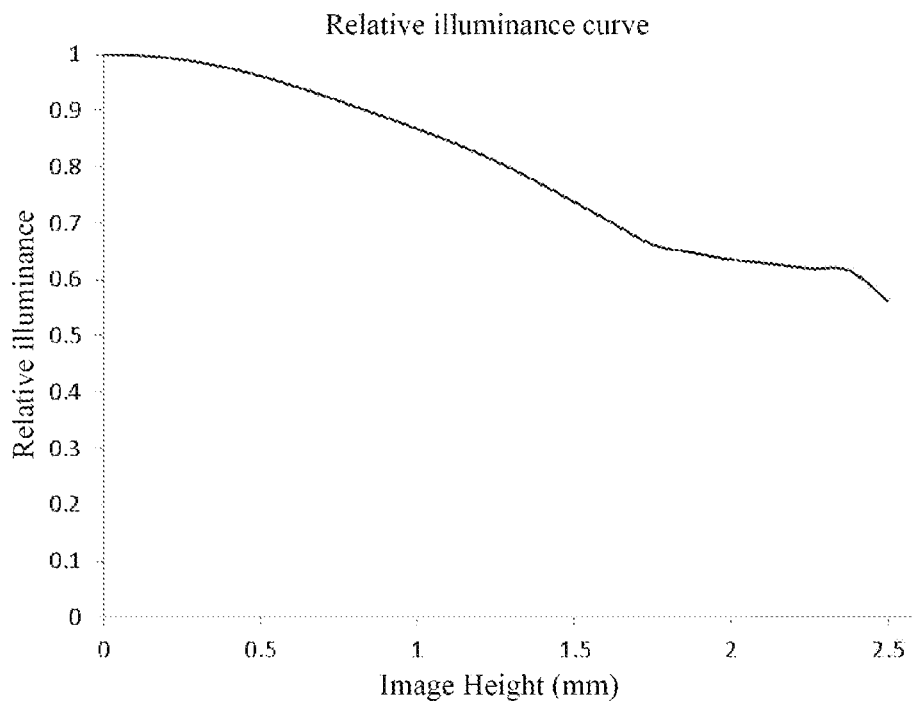

FIG. 8A shows a longitudinal aberration curve of the optical imaging lens assembly according to example 4, representing deviations of focal points converged by light of different wavelengths after passing through the lens assembly. FIG. 8B shows an astigmatic curve of the optical imaging lens assembly according to example 4, representing a curvature of a tangential plane and a curvature of a sagittal plane. FIG. 8C shows a distortion curve of the optical imaging lens assembly according to example 4, representing amounts of distortion corresponding to different image heights. FIG. 8D shows a lateral color curve of the optical imaging lens assembly according to example 4, representing deviations of different image heights on an imaging plane after light passes through the lens assembly. FIG. 8E shows a relative illuminance curve of the optical imaging lens assembly according to example 4, representing the relative illuminance values corresponding to different image heights. It can be seen from FIG. 8A to FIG. 8E that the optical imaging lens assembly provided in example 4 can achieve good image quality.

Example 5

Figure 9:
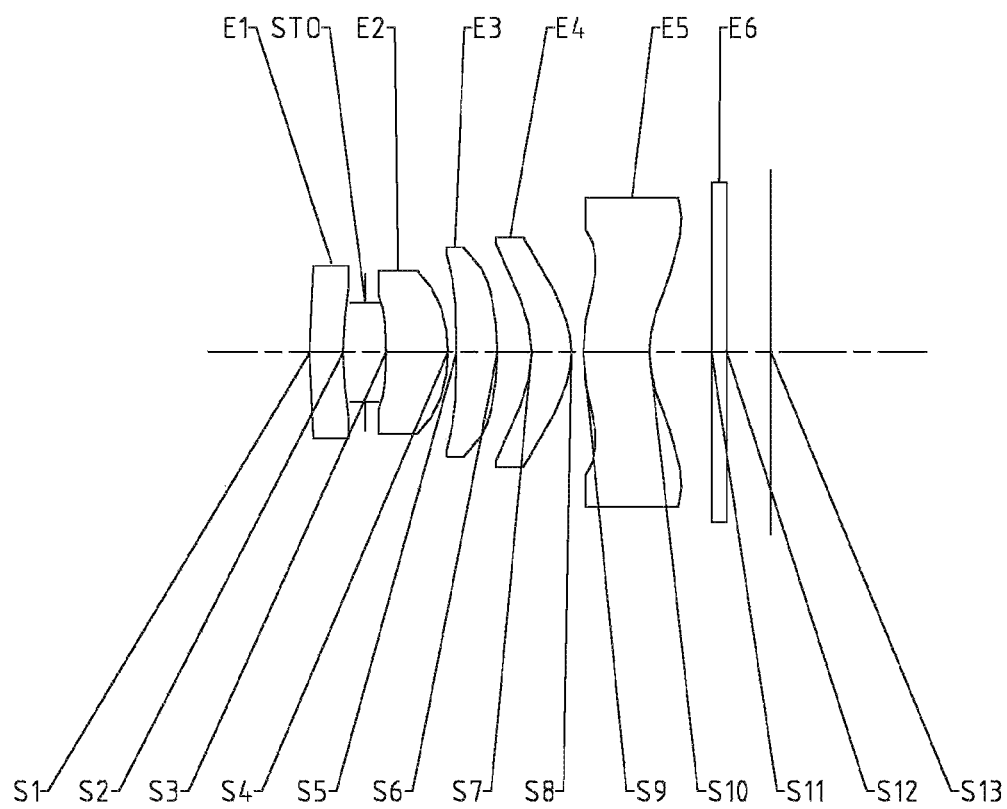
FIG. 9 shows a schematic structural diagram of an optical imaging lens assembly according to Example 5 of the present disclosure.

An optical imaging lens assembly according to Example 5 of the present disclosure is described below with reference to FIG. 9 to FIG. 10E. FIG. 9 shows a schematic structural view of the optical imaging lens assembly according to Example 5 of the present disclosure.

As shown in FIG. 9, the optical imaging lens assembly includes a first lens E1, a stop STO, a second lens E2, a third lens E3, a fourth lens E4, a fifth lens E5, an optical filter E6, a protective glass (not shown) and an imaging plane S13, which are sequentially arranged from an object side to an image side.

The first lens E1 has a negative refractive power, an object side surface S1 of the first lens is a convex surface, and an image side surface S2 of the first lens is a concave surface. The second lens E2 has a positive refractive power, an object side surface S3 of the second lens is a concave surface, and an image side surface S4 of the second lens is a convex surface. The third lens E3 has a positive refractive power, an object side surface S5 of the third lens is a concave surface, and an image side surface S6 of the third lens is a convex surface. The fourth lens E4 has a positive refractive power, an object side surface S7 of the fourth lens is a concave surface, and an image side surface S8 of the fourth lens is a convex surface. The fifth lens E5 has a negative refractive power, an object side surface S9 of the fifth lens is a convex surface, and an image side surface S10 of the fifth lens is a concave surface. The optical filter E6 has an object side surface S11 and an image side surface S12. Light from an object sequentially passes through the respective surfaces S1 to S12 and is finally imaged on the imaging plane S13.

In this example, the total effective focal length f of the optical imaging lens assembly satisfies f=2.75 mm, the total length TTL of the optical imaging lens assembly satisfies TTL=6.35 mm, half of the diagonal length ImgH of the effective pixel area on the imaging plane S13 of the optical imaging lens assembly satisfies ImgH=2.50 mm, and half of the maximal field-of-view Semi-FOV of the optical imaging lens assembly satisfies Semi-FOV=52.51°.

Table 9 is a table showing basic parameters of the optical imaging lens assembly of example 5, wherein the units for the radius of curvature, the thickness/distance and the focal length are millimeter (mm). Table 10 shows the higher-order coefficients that can be used for each aspheric surface in Example 5, where each aspheric surface type can be defined by the formula (1) given in Example 1 above.

TABLE 9

| Surface number | Surface type | Radius of curvature | Thickness/ Distance | Material Refractive index | Abbe number | Focal length | Conic coefficient |
|---|---|---|---|---|---|---|---|
| OBJ | Spherical | Infinite | Infinite | | | | |
| S1 | Aspheric | 10.1941 | 0.4602 | 1.64 | 20.4 | −13.39 | −50.3920 |
| S2 | Aspheric | 4.5550 | 0.3055 | | | | −1.1422 |
| STO | Spherical | Infinite | 0.2862 | | | | |
| S3 | Aspheric | −7.3886 | 0.8500 | 1.76 | 49.6 | 4.03 | 0.0000 |
| S4 | Aspheric | −2.2693 | 0.1197 | | | | 1.8017 |
| S5 | Aspheric | −16.0368 | 0.5618 | 1.64 | 20.4 | 9.99 | −2.7476 |
| S6 | Aspheric | −4.5126 | 0.4704 | | | | 5.7712 |
| S7 | Aspheric | −1.7794 | 0.5469 | 1.64 | 20.4 | 5.39 | 0.2773 |
| S8 | Aspheric | −1.2956 | 0.1658 | | | | −3.2282 |
| S9 | Aspheric | 3.5466 | 0.9082 | 1.64 | 20.4 | −6.24 | −45.5050 |
| S10 | Aspheric | 1.6664 | 0.8572 | | | | −0.4911 |
| S11 | Spherical | Infinite | 0.2100 | 1.51 | 64.2 | | |
| S12 | Spherical | Infinite | 0.6050 | | | | |
| S13 | Spherical | Infinite | | | | | |

TABLE 10

| Surface number | $A_4$ | $A_6$ | $A_8$ | $A_{10}$ | $A_{12}$ | $A_{14}$ | $A_{16}$ | $A_{18}$ | $A_{20}$ |
|---|---|---|---|---|---|---|---|---|---|
| S1 | 3.3999E−02 | −1.2748E−01 | 3.1935E−01 | −4.9043E−01 | 4.2388E−01 | −1.9063E−01 | 3.4240E−02 | 0.0000E+00 | 0.0000E+00 |
| S2 | 5.3821E−02 | −3.6996E−01 | 1.3028E+00 | −2.9077E+00 | 3.7280E+00 | −2.5595E+00 | 7.1930E−01 | 0.0000E+00 | 0.0000E+00 |
| S3 | −5.5016E−02 | −1.0344E+00 | 8.5553E+00 | −3.9520E+01 | 1.0158E+02 | −1.4327E+02 | 8.9730E+01 | 6.3163E+00 | −2.4772E+01 |
| S4 | −7.5234E−02 | 5.1208E−01 | −2.2827E+00 | 5.9128E+00 | −1.0158E+01 | 1.1407E+01 | 7.9524E+00 | 3.1123E+00 | −5.2058E−01 |
| S5 | −9.9697E−02 | 6.2401E−01 | −1.7314E+00 | 2.7574E+00 | −2.9089E+00 | 2.0046E+00 | −8.4773E−01 | 1.9797E−01 | −1.9498E−02 |
| S6 | −1.3725E−01 | 3.5618E−01 | −4.5503E−01 | 3.6348E−01 | −2.1347E−01 | 6.8814E−02 | 1.3542E−03 | −7.2805E−03 | 1.3954E−03 |
| S7 | −1.3766E−01 | 6.6312E−01 | −1.2490E+00 | 1.5388E+00 | −1.1666E+00 | 5.0743E−01 | −1.0819E−01 | 4.9272E−03 | 1.1770E−03 |
| S8 | 9.6778E−02 | −3.2994E−01 | 5.3122E−01 | −6.5713E−01 | 6.7718E−01 | −5.0743E−01 | 1.4431E−01 | −3.0223E−02 | 2.6674E−03 |
| S9 | 3.7010E−01 | −7.5405E−01 | 9.0806E−01 | −8.0725E−01 | 5.1621E−01 | −2.2513E−01 | 6.2655E−02 | −9.9608E−03 | 6.8559E−04 |
| S10 | 2.4734E−02 | −1.8277E−01 | 1.5368E−01 | −7.4643E−02 | 2.2661E−02 | −4.2980E−03 | 4.7849E−04 | −2.6557E−05 | 4.2387E−07 |

Figures 10A, 10B:
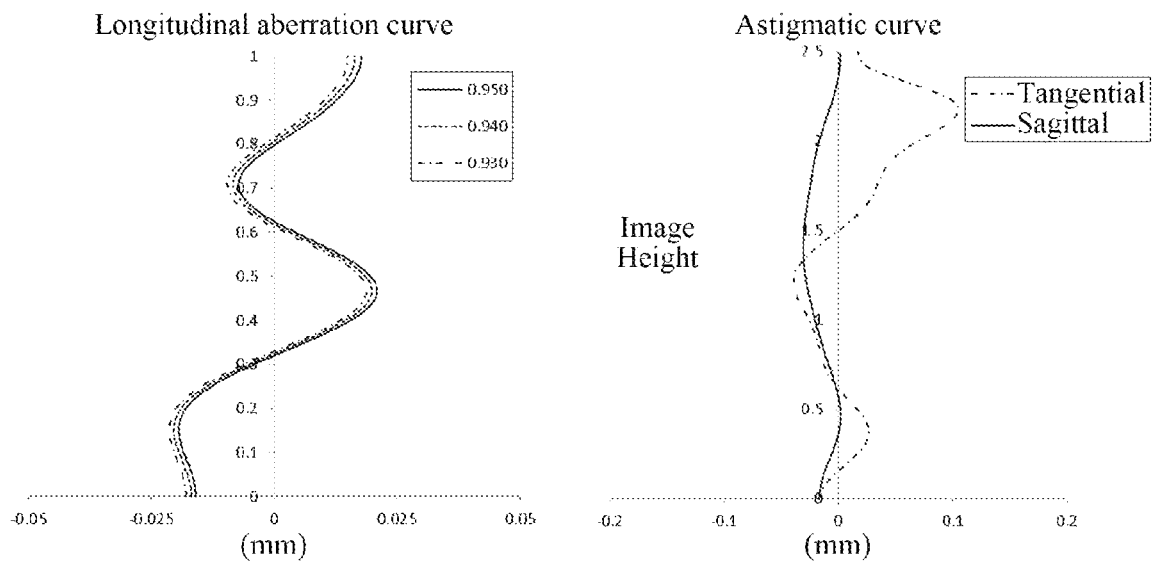
FIGS. 10A-10E respectively show a longitudinal aberration curve, an astigmatism curve, a distortion curve, a lateral color curve, and a relative illuminance curve of the optical imaging lens assembly of Example 5.
Figure 10C:
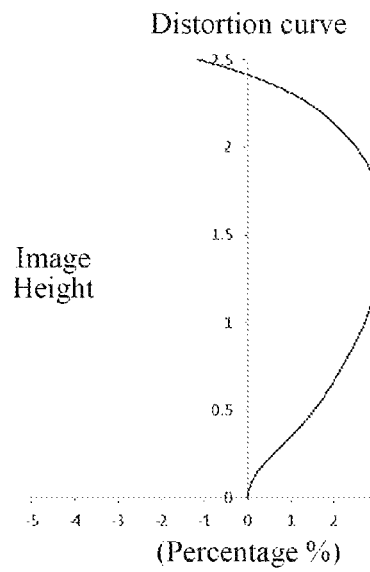
Figure 10D:
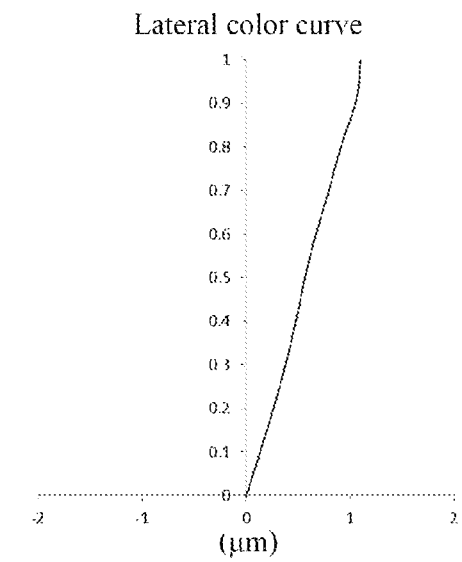
Figure 10E:
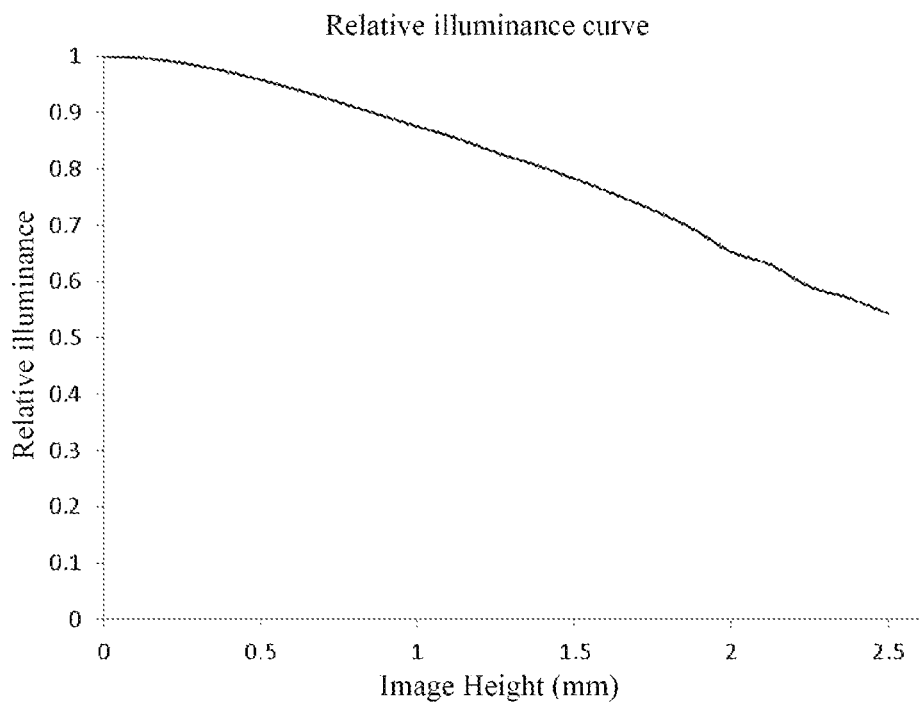

FIG. 10A shows a longitudinal aberration curve of the optical imaging lens assembly according to example 5, representing deviations of focal points converged by light of different wavelengths after passing through the lens assembly. FIG. 10B shows an astigmatic curve of the optical imaging lens assembly according to example 5, representing a curvature of a tangential plane and a curvature of a sagittal plane. FIG. 10C shows a distortion curve of the optical imaging lens assembly according to example 5, representing amounts of distortion corresponding to different image heights. FIG. 10D shows a lateral color curve of the optical imaging lens assembly according to example 5, representing deviations of different image heights on an imaging plane after light passes through the lens assembly. FIG. 10E shows a relative illuminance curve of the optical imaging lens assembly according to example 5, representing the relative illuminance values corresponding to different image heights. It can be seen from FIG. 10A to FIG. 10E that the optical imaging lens assembly provided in example 5 can achieve good image quality.

In summary, Examples 1 to 5 satisfy the relationships shown in Table 11, respectively.

TABLE 11

| Conditional/Example | 1 | 2 | 3 | 4 | 5 |
|---|---|---|---|---|---|
| f/EPD | 2.00 | 2.00 | 2.00 | 2.00 | 2.00 |
| ImgH/Tan(Semi-FOV) (mm) | 1.84 | 1.84 | 1.84 | 1.84 | 1.92 |
| V3 + V4 + V5 | 61.20 | 61.20 | 61.20 | 61.20 | 61.20 |
| f1/f2 | −4.51 | −2.23 | −2.89 | −3.64 | −3.32 |

TABLE 11-continued

| Conditional/Example | 1 | 2 | 3 | 4 | 5 |
|---|---|---|---|---|---|
| |f5/f| | 3.32 | 2.37 | 4.36 | 1.80 | 2.27 |
| |f4/f| | 1.74 | 2.21 | 2.18 | 1.27 | 1.96 |
| |f3/f| | 6.67 | 2.09 | 1.89 | 4.47 | 3.63 |
| (R1 + R2)/(R1 − R2) | 5.39 | 4.08 | 5.15 | 4.53 | 2.62 |
| |(R7 + R8)/(R7 − R8)| | 5.39 | 2.91 | 2.93 | 3.93 | 6.36 |
| R9/R10 | 1.74 | 0.89 | 1.05 | 2.34 | 2.13 |
| f2/R4 | −1.65 | −1.88 | −1.86 | −1.44 | −1.77 |
| |f3/R6| | 1.84 | 1.35 | 1.26 | 2.56 | 2.21 |
| T12/CT1 | 1.84 | 1.39 | 1.19 | 2.76 | 1.29 |
| CT2/T23 | 8.50 | 6.96 | 8.10 | 6.10 | 7.10 |
| T34/T45 | 7.61 | 3.15 | 2.05 | 1.58 | 2.84 |

The present disclosure also provides an imaging device, the electronic photosensitive element of which may be a photosensitive coupling element (CCD) or a complementary metal oxide semiconductor element (CMOS). The imaging device may be an independent imaging device such as a digital camera, or an imaging module integrated in a mobile electronic device such as a mobile phone. The imaging device is equipped with the optical imaging lens assembly described above.

The foregoing is only a description of the preferred examples of the present disclosure and the applied technical principles. It should be appreciated by those skilled in the art that the inventive scope of the present disclosure is not limited to the technical solutions formed by the particular combinations of the above technical features. The inventive scope should also cover other technical solutions formed by any combinations of the above technical features or equivalent features thereof without departing from the concept of the invention, such as, technical solutions formed by replacing the features as disclosed in the present disclosure with (but not limited to), technical features with similar functions.

What is claimed is:

1. An optical imaging lens assembly, comprising, sequentially from an object side to an image side of the optical imaging lens assembly along an optical axis:
   a first lens having a negative refractive power, an object side surface of the first lens is convex surface and an image side surface of the first lens is a concave surface;
   a stop;
   a second lens having a positive refractive power, an object side surface of the second lens is a concave surface at a paraxial area and an image side surface of the second lens is a convex surface at the paraxial area;
   a third lens having a refractive power;
   a fourth lens having a refractive power, an object side surface of the fourth lens is a concave surface and an image side surface of the fourth lens is a convex surface; and
   a fifth lens having a refractive power,
   wherein a number of lenses having refractive powers in the optical imaging lens assembly is five;
   an arrangement of the refractive powers of the third lens, the fourth lens and the fifth lens are negative-positive-negative, or positive-negative-positive, or positive-positive-negative;
   a radius of curvature R1 of the object side surface of the first lens and a radius of curvature R2 of the image side surface of the first lens satisfy: $2.5<(R1+R2)/(R1-R2)<5.5$;
   a relative illuminance RI corresponding to a maximal field-of-view of the optical imaging lens assembly satisfies: $RI \geq 50\%$;
   wherein an effective focal length f4 of the fourth lens and a total effective focal length f of the optical imaging lens satisfy: $1.27 \leq |f4/f| < 2.5$;
   wherein a radius of curvature R7 of the object side surface of the fourth lens and a radius of curvature R8 of the image side surface of the fourth lens satisfy: $2.5<|(R7+R8)/(R7-R8)|<6.5$; and
   at least one of the first lens to the fifth lens is a lens made of plastic material.

2. The optical imaging lens assembly according to claim 1, wherein an Abbe number V3 of the third lens, an Abbe number V4 of the fourth lens, and an Abbe number V5 of the fifth lens satisfy: $V3+V4+V5<65$.

3. The optical imaging lens assembly according to claim 1, wherein an effective focal length f1 of the first lens and an effective focal length f2 of the second lens satisfy: $-5.0<f1/f2<-2.0$.

4. The optical imaging lens assembly according to claim 1, wherein an effective focal length f5 of the fifth lens and a total effective focal length f of the optical imaging lens assembly satisfy: $1.5<|f5/f|<4.5$.

5. The optical imaging lens assembly according to claim 1, wherein an effective focal length f5 of the fifth lens and a total effective focal length f of the optical imaging lens assembly satisfy: $3.32 \leq |f5/f| < 4.5$.

6. The optical imaging lens assembly according to claim 1, wherein an effective focal length f3 of the third lens and a total effective focal length f of the optical imaging lens satisfy: $1.5<|f3/f|<7.0$.

7. The optical imaging lens assembly according to claim 1, wherein a radius of curvature R9 of an object side surface of the fifth lens and a radius of curvature R10 of an image side surface of the fifth lens satisfy: $0.5<R9/R10<2.5$.

8. The optical imaging lens assembly according to claim 1, wherein an effective focal length f2 of the second lens and a radius of curvature R4 of the image side surface of the second lens satisfy: $-2.0<f2/R4 \leq -1.44$.

9. The optical imaging lens assembly according to claim 1, wherein an effective focal length f3 of the third lens and a radius of curvature R6 of an image side surface of the third lens satisfy: $1.0<|f3/R6|<3.0$.

10. The optical imaging lens assembly according to claim 1, wherein a central thickness CT1 of the first lens along the optical axis and a spaced interval T12 between the first lens and the second lens along the optical axis satisfy: $1.0<T12/CT1<3.0$.

11. The optical imaging lens assembly according to claim 1, wherein a central thickness CT2 of the second lens along the optical axis and a spaced interval T23 between the second lens and the third lens along the optical axis satisfy: $6.0<CT2/T23<8.6$.

12. The optical imaging lens assembly according to claim 1, wherein a spaced interval T34 between the third lens and the fourth lens on the optical axis and a spaced interval T45 between the fourth lens and the fifth lens on the optical axis satisfy: $1.5<T34/T45<8.0$.

13. The optical imaging lens assembly according to claim 1, wherein at least one of the first lens to the fifth lens is a glass aspheric lens.

14. The optical imaging lens assembly according to claim 1, wherein a distortion fθ of the optical imaging lens assembly satisfy: $|f\theta|<5\%$.

15. The optical imaging lens assembly according to claim 1, wherein a total effective focal length f of the optical imaging lens assembly and an entrance pupil diameter EPD of the optical imaging lens assembly satisfy: $f/EPD<2.1$.

16. The optical imaging lens assembly according to claim 1, wherein a half of the diagonal length ImgH of an effective pixel area on an imaging plane of the optical imaging lens assembly and a half of a maximal field-of-view Semi-FOV of the optical imaging lens assembly satisfy: $1.0 \text{ mm}<\text{ImgH}/\text{Tan(Semi-FOV)}<2.0 \text{ mm}$.

17. An optical imaging lens assembly, comprising, sequentially from an object side to an image side of the optical imaging lens assembly along an optical axis:
   a first lens having a negative refractive power, an object side surface of the first lens is a convex surface and an image side surface of the first lens is a concave surface;
   a stop;
   a second lens having a positive refractive power, an object side surface of the second lens is a concave surface at a paraxial area and an image side surface of the second lens is a convex surface at the paraxial area;
   a third lens having a refractive power;

a fourth lens having a refractive power, an object side surface of the fourth lens is concave surface and an image side surface of the fourth lens is a convex surface; and a fifth lens having a refractive power, wherein a number of lenses having refractive powers in the optical imaging lens assembly is five;

an arrangement of the refractive powers of the third lens, the fourth lens and the fifth lens are negative-positive-negative, or positive-negative-positive, or positive-positive-negative;

a radius of curvature R1 of the object side surface of the first lens and a radius of curvature R2 of the image side surface of the first lens satisfy: $2.5<(R1+R2)/(R1-R2)<5.5$;

an effective focal length f5 of the fifth lens and a total effective focal length f of the optical imaging lens assembly satisfy: $1.5<|f5/f|<4.5$;

wherein an effective focal length f4 of the fourth lens and a total effective focal length f of the optical imaging lens satisfy: $1.27 \leq |f4/f| < 2.5$;

wherein a radius of curvature R7 of the object side surface of the fourth lens and a radius of curvature R8 of the image side surface of the fourth lens satisfy: $2.5<|(R7+R8)/(R7-R8)|<6.5$; and at least one of the first lens to the fifth lens is a lens made of plastic material.

18. The optical imaging lens assembly according to claim 17, wherein the effective focal length f5 of the fifth lens and the total effective focal length f of the optical imaging lens assembly satisfy: $1.80 \leq |f5/f| < 4.5$.

* * * * *